US012754384B2

(12) United States Patent
Harris et al.

(10) Patent No.: US 12,754,384 B2
(45) Date of Patent: Oct. 6, 2026

(54) OPTICAL FIBER ARRAY WITH OPTICAL PASSTHROUGH

(71) Applicant: Lightmatter, Inc., Boston, MA (US)

(72) Inventors: Nicholas C. Harris, Menlo Park, CA (US); Jessie Rosenberg, Bedford, MA (US); Chian-min Richard Ho, Palo Alto, CA (US); Sandeep Sane, Chandler, AZ (US); Binoy Shah, Niskayuna, NY (US); Shashank Gupta, Newton, MA (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 369 days.

(21) Appl. No.: 18/432,770

(22) Filed: Feb. 5, 2024

(65) Prior Publication Data

US 2024/0264395 A1 Aug. 8, 2024

Related U.S. Application Data

(60) Provisional application No. 63/462,164, filed on Apr. 26, 2023, provisional application No. 63/443,550, filed on Feb. 6, 2023.

(51) Int. Cl.
*G02B 6/42* (2006.01)

(52) U.S. Cl.
CPC ......... *G02B 6/4293* (2013.01); *G02B 6/4215* (2013.01); *G02B 6/4272* (2013.01); *G02B 6/4281* (2013.01); *G02B 6/4244* (2013.01)

(58) Field of Classification Search
CPC .. G02B 6/4293; G02B 6/4272; G02B 6/4281; G02B 6/4244
See application file for complete search history.

(56) References Cited

U.S. PATENT DOCUMENTS

| | | | | |
|---|---|---|---|---|
| 9,995,881 | B1 * | 6/2018 | Patel | G02B 6/122 |
| 2022/0155526 | A1 | 5/2022 | Dong et al. | |
| 2022/0159860 | A1 | 5/2022 | Winzer | |
| 2022/0299708 | A1 | 9/2022 | Chen et al. | |

OTHER PUBLICATIONS

International Search Report and Written Opinion dated Jun. 28, 2024, in connection with International Application No. PCT/US2024/14435.
Invitation to Pay Additional Fees dated Apr. 15, 2024, in connection with International Application No. PCT/US2024/014435.
PCT/US2024/014435, Apr. 15, 2024, Invitation to Pay Additional Fees.

* cited by examiner

*Primary Examiner* — Sung H Pak
(74) *Attorney, Agent, or Firm* — Wolf, Greenfield & Sacks, P.C.

(57) ABSTRACT

Provided herein are optical fiber arrays and optical assemblies included optical fiber arrays. The optical fiber array includes a fiber array chip that has first optical connections disposed on a first edge of the fiber array chip and second optical connections disposed on a second edge of the fiber array chip. Optical fibers are coupled to the first optical connections. Active devices (e.g., photonic and/or electronic devices) are disposed on the fiber array chip. The optical fiber array is removably, optically couplable to another optical component such as a photonic integrated circuit.

29 Claims, 16 Drawing Sheets

OPTICAL FIBER ARRAY WITH OPTICAL PASSTHROUGH

CROSS-REFERENCE TO RELATED APPLICATIONS

This application claims the benefit of U.S. Provisional Application Ser. No. 63/443,550, filed on Feb. 6, 2023, and entitled “ELECTRICALLY-POWERED OPTICAL FIBER ARRAY WITH OPTICAL PASSTHROUGH,” and this application also claims the benefit of U.S. Provisional Application Ser. No. 63/462,164, filed on Apr. 26, 2023, and entitled “ELECTRICALLY-POWERED OPTICAL FIBER ARRAY WITH OPTICAL PASSTHROUGH,” each of which is hereby incorporated herein by reference in its entirety.

BACKGROUND

Field

The aspects described herein relate to optical fiber arrays.

Related Art

Optical fiber arrays, or fiber-optic arrays or fiber array units, are one- or two-dimensional arrays of optical fibers, typically formed at an end of a bundle of optical fibers. Arranging the optical fibers into an optical fiber array simplifies the task of coupling light output from the optical fibers to another optical component in an optical system.

BRIEF SUMMARY

Some embodiments provide a pluggable optical fiber array. The pluggable optical fiber array comprises: a fiber array chip comprising first optical connections disposed on a first edge of the fiber array chip and second optical connections disposed on a second edge of the fiber array chip; and optical fibers coupled to the first optical connections.

In some embodiments, the second optical connections are configured to optically couple the fiber array chip to one or more optical waveguides disposed on another chip. In some embodiments, the second optical connections comprise edge couplers.

In some embodiments, the first optical connections comprise v-grooves.

In some embodiments, the fiber array chip comprises a photonic integrated circuit (PIC). In some embodiments, the PIC comprises at least one active device comprising a photonic and/or electronic device.

In some embodiments, the at least one active device is coupled to the first optical connections and/or the second optical connections.

In some embodiments, the at least one active device comprises at least one laser. In some embodiments, the at least one active device comprises a laser array.

In some embodiments, the laser array comprises lasers configured to generate optical signals having different wavelengths, and the pluggable optical fiber array further comprises a multiplexer disposed between the laser array and the second optical connections, the multiplexer configured to perform wavelength division multiplexing of the generated optical signals. In some embodiments, the multiplexer comprises an arrayed waveguide grating (AWG). In some embodiments, the multiplexer comprises one or more Mach-Zehnder interferometers (MZIs).

In some embodiments, the at least one active device comprises a photodetector.

In some embodiments, the at least one active device comprises a semiconductor optical amplifier (SOA).

In some embodiments, the SOA is coupled between the first optical connections and the second optical connections.

In some embodiments, the pluggable optical fiber array further comprises a printed circuit board (PCB) electrically coupled to the fiber array chip. In some embodiments, the PCB is a flexible PCB. In some embodiments, the PCB is electrically coupled to the fiber array chip by solder bonds or thermocompression bonds.

In some embodiments, the PCB further comprises thermal vias configured to thermally couple the fiber array chip to a substrate disposed on an opposing side of the PCB. In some embodiments, the substrate comprises a thermal spacer. In some embodiments, the substrate comprises a silicon substrate or an aluminum nitride substrate.

In some embodiments, the pluggable optical fiber array further comprises a cold plate thermally coupled to the substrate.

In some embodiments, the pluggable optical fiber array further comprises optical fibers optically coupled to the first optical connections. In some embodiments, the optical fibers are supported by the PCB.

Some embodiments provide an optical assembly, comprising: a first photonic integrated circuit (PIC) comprising first waveguides; and a second PIC removably coupled to the first PIC, the second PIC comprising second waveguides optically aligned with the first waveguides.

In some embodiments, the first waveguides and the second waveguides are coupled by edge couplers disposed on the first PIC and the second PIC.

In some embodiments, the second waveguides of the second PIC are disposed on a first edge of the second PIC, and the second PIC further comprises additional optical connections disposed on a second edge of the second PIC. In some embodiments, the additional optical connections comprise v-grooves.

In some embodiments, the second PIC comprises at least one active device comprising a photonic and/or electronic device.

In some embodiments, the at least one active device is coupled to the second waveguides or to the additional optical connections.

In some embodiments, the at least one active device comprises at least one laser. In some embodiments, the at least one active device comprises a laser array.

In some embodiments, the laser array comprises lasers configured to generate optical signals having different wavelengths, and the second PIC further comprises a multiplexer disposed between the laser array and the second waveguides, the multiplexer configured to perform wavelength division multiplexing of the generated optical signals. In some embodiments, the multiplexer comprises an arrayed waveguide grating (AWG). In some embodiments, the multiplexer comprises one or more Mach-Zehnder interferometers (MZIs).

In some embodiments, the at least one active device comprises a photodetector.

In some embodiments, the at least one active device comprises a semiconductor optical amplifier (SOA). In some embodiments, the SOA is coupled between the first optical connections and the second optical connections.

In some embodiments, the optical assembly further comprises a printed circuit board (PCB) electrically coupled to the second PIC. In some embodiments, the PCB is a flexible PCB. In some embodiments, the PCB is electrically coupled to the fiber array chip by solder bonds or thermocompression bonds.

In some embodiments, the PCB further comprises thermal vias configured to thermally couple the fiber array chip to a thermal substrate disposed on an opposing side of the PCB. In some embodiments, the thermal substrate comprises a thermal spacer. In some embodiments, the thermal substrate comprises a silicon substrate or an aluminum nitride substrate. In some embodiments, the optical assembly further comprises a first cold plate thermally coupled to the substrate.

In some embodiments, the optical assembly further comprises optical fibers optically coupled to the additional optical connections. In some embodiments, the optical fibers are supported by the PCB.

In some embodiments, the optical assembly further comprises a substrate supporting the first PIC. In some embodiments, the substrate supporting the first PIC is an organic substrate.

In some embodiments, the second PIC is disposed between the thermal substrate and the substrate supporting the first PIC.

In some embodiments, the first PIC is electrically coupled to circuitry. In some embodiments, the circuitry comprises an application-specific integrated circuit (ASIC).

In some embodiments, the first PIC is thermally coupled to a second cold plate.

Some embodiments provide a method of manufacturing an optical assembly. The method comprises: bonding a fiber array chip comprising first optical connections arranged along a first edge of the fiber array chip and second optical connections arranged along a second edge of the fiber array chip to a printed circuit board (PCB); and coupling optical fibers to the first optical connections of the fiber array chip.

In some embodiments, bonding the fiber array chip to the PCB comprises making electrical connections between the fiber array chip and the PCB. In some embodiments, bonding the fiber array chip to the PCB comprises bonding the fiber array chip to a flexible PCB.

In some embodiments, coupling the optical fibers to the first optical connections comprises coupling the optical fibers to the first optical connections through an opening in the PCB. In some embodiments, coupling the optical fibers to the first optical connections comprises coupling the optical fibers to v-grooves disposed on the fiber array chip.

In some embodiments, coupling the optical fibers to the first optical connections further comprises coupling the optical fibers to at least one active device disposed on the fiber array chip, the at least one active device comprises a photonic and/or electronic device.

In some embodiments, the method further comprises bonding a thermal substrate to the PCB, the thermal substrate being bonding to a side of the PCB opposing the fiber array chip. In some embodiments, bonding the thermal substrate to the PCB comprises bonding a silicon substrate or an aluminum nitride substrate to the PCB.

In some embodiments, the method further comprises coupling a cold plate to the thermal substrate.

In some embodiments, the method further comprises thermally coupling the fiber array chip to the cold plate through the PCB and thermal substrate.

In some embodiments, the method further comprises optically coupling the second optical connections of the fiber array chip to a photonic integrated circuit (PIC) external to the fiber array chip.

In some embodiments, optically coupling the second optical connections to the PIC comprises aligning the second optical connections with optical waveguides disposed on the PIC. In some embodiments, optically coupling the second optical connections to the PIC comprises aligning edge couplers of the fiber array chip with edge couplers of the PIC.

BRIEF DESCRIPTION OF DRAWINGS

Various aspects and embodiments will be described with reference to the following figures. It should be appreciated that the figures are not drawn to scale. In the drawings, each identical or nearly identical component that is illustrated in various figures is represented by a like numeral. For purposes of clarity, not every component may be labeled in every drawing.

DETAILED DESCRIPTION

Optical fiber arrays are most often implemented as passive devices that do not include active electrical or optical devices (e.g., electrical or optical devices that can be controlled, modulated, and/or operated using electrical signals) on board the optical fiber array. Optical fiber arrays are typically passive devices because optical coupling of the optical fiber array to another optical component can require sensitive optical alignment between the optical fiber array and the coupled optical component. Such sensitive optical alignment is at odds with electrical connectivity of the optical fiber array, as electrical connections are typically fixed but the ability to freely movement the optical fiber array may be required to perform the optical alignment properly.

Figure 1:
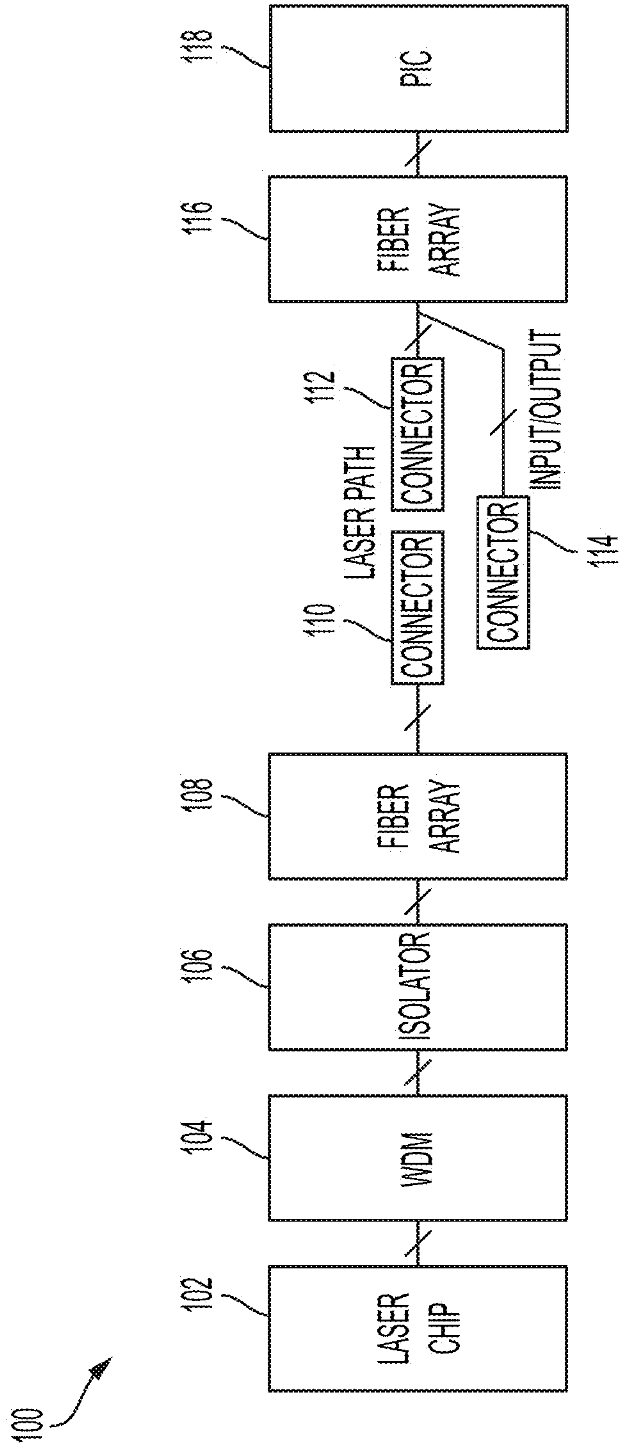
FIG. 1 is a schematic diagram of a system for coupling optical signals to a photonic integrated circuit (PIC).

Optical fiber arrays may be used to couple signals to or from a photonic integrated circuit (PIC). Today, PICs are manufactured either with lasers integrated on the PIC itself or disposed on an external laser module with a fiber interconnect to route the light. FIG. 1 shows an example block diagram of a conventional system 100 for coupling optical signals to a PIC 118. The system 100 includes a laser chip 102 which generates optical signals that are routed to the PIC through other components such as, for example, a wavelength division multiplexer 104, isolator 106, optical fiber array 108, connectors 110 and 112, and another optical fiber array 116. Additional inputs and/or outputs to the PIC may be provided through an additional connector 114, which routes these inputs and outputs through the optical fiber array 116.

Figure 2:
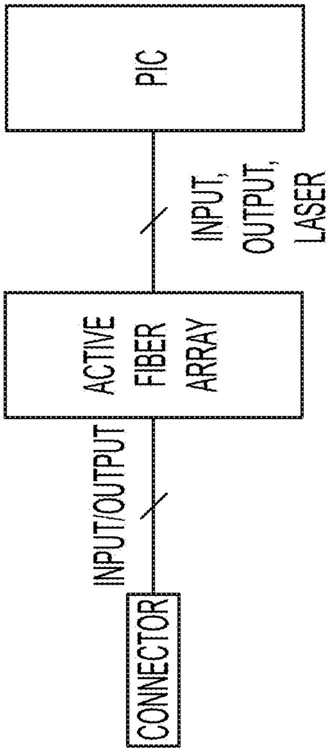
FIG. 2 is a schematic diagram of a system for optically coupling optical signals to a PIC, the system having a reduced number of components, in accordance with some embodiments described herein.

The inventors have recognized and appreciated that by integrating active components onto an optical fiber array, the large number of components shown in FIG. 1 may be significantly reduced, thereby simplifying optical design and reducing manufacturing cost of optical systems. FIG. 2 shows an example block diagram of an optical system 200 including an active optical fiber array 106. The optical system 200 includes only three main components, the connectors 104 providing inputs and/or outputs to the active optical fiber array 106 and the PIC 108 that is optically coupled to the active optical fiber array 106. Using an active optical fiber array, such as shown in the example of FIG. 2, significantly simplifies the optical link between laser sources, the target PIC, and optical inputs and/or outputs.

The inventors have also recognized and appreciated that integrating active components onto an optical fiber array can reduce the cost of integrating an off-chip laser into an optical system. On-chip lasers often suffer from significant thermal aggression, especially when tightly integrated with advanced node application-specific integrated circuits (ASICs) that operate at 100° C. or more. Off-chip lasers also require individual packaging and are not highly integrated systems because there are significant limits to the number of lasers that can be integrated in a package with traditional approaches. Through dense integration of active devices onto an optical fiber array, the cost of optically enabled systems can be dramatically reduced.

Conventional optical fiber arrays are also often physically coupled to other optical components in a fixed manner, making it more difficult and time consuming to replace a failed optical fiber array in an optical system. However, optical fibers are delicate in nature and may be damaged easily, resulting in a need to replace optical fiber arrays with some frequency. In certain applications, such as complex photonic computing systems integrated into data centers, the increased difficulty of and time to perform maintenance can quickly increase costs associated with running the optical system and/or increase downtime of the system. The inventors have further recognized and appreciated that optical fiber arrays including active devices that are configured to be "pluggable" (e.g., removably coupled from the optical system and interchangeable) can reduce maintenance costs and/or downtime of optical systems.

Accordingly, the inventors have developed optical fiber arrays and optical assemblies including optical fiber arrays with active devices enabling, for example, laser integration, actively locked wavelength division multiplexing, optical power monitoring, and semiconductor optical amplifiers (SOAs). Applications for such optical fiber arrays include, as non-limiting examples, optical computation, light detection and ranging (LIDAR), optical sensing, optical communications, and optical flow switching.

In some embodiments, a pluggable optical fiber array is provided. The pluggable optical fiber array includes a fiber array chip having a set of optical connections disposed on one edge of the fiber array chip and another set of optical connections disposed on another edge of the fiber array chip. The two sets of optical connections may be on opposing edges of the fiber array chip (e.g., such that the fiber array chip is between the two edges) or may be on neighboring edges of the fiber array chip (e.g., such that the two edges meet at a corner of the fiber array chip).

In some embodiments, the pluggable optical fiber array includes optical fibers coupled to one of the sets of optical connections. The optical connections coupling the optical fibers to the fiber array chip are fiber couplers such as, for example, v-grooves.

In some embodiments, the other optical connections are configured to, when the optical fiber array is included in an optical assembly, optically couple the fiber array chip to one or more optical waveguides disposed on another chip (e.g., a chip external to the fiber array chip). For example, when the optical fiber array is included in an optical assembly, the fiber array chip may be optically coupled to a PIC (e.g., optically coupling the fiber array chip to waveguides disposed on the PIC). In some embodiments, the optical connections coupling the fiber array chip to the PIC are waveguide couplers such as, for example, edge couplers.

In some embodiments, the fiber array chip is also a PIC, and the PIC includes at least one active device (e.g., an active photonic and/or electronic device) that is electrically powered, controlled, and/or operated. The active device is coupled to one or both sets of optical connections of the fiber array chip.

As one non-limiting example, in some embodiments the active device includes a laser or a laser array having lasers configured to generate light of different wavelengths during operation of the pluggable optical fiber array. In some embodiments, the PIC also includes a multiplexer configured to perform wavelength division multiplexing (WDM) of the optical signals generated by a laser array disposed on the PIC. The multiplexer may be, for example, an arrayed waveguide grating (AWG) and/or Mach-Zehnder interferometers (MZIs).

As another non-limiting example, the active device includes a photodetector (e.g., a diode) in some embodiments. Alternatively or additionally, in some embodiments the active device includes a semiconductor optical amplifier (SOA). The SOA is coupled between the two sets of optical connections of the fiber array chip, in some embodiments. In some embodiments, the active device includes a reflective semiconductor optical amplifier (RSOA).

In some embodiments, the pluggable optical fiber array also includes a printed circuit board (PCB) electrically coupled to the fiber array chip. The PCB is configured to power the fiber array chip, and any active devices disposed on the fiber array chip, during operation of the pluggable optical fiber array. In some embodiments, the PCB is electrically coupled to the fiber array chip by solder bonds or thermocompression bonds. In some embodiments, the PCB may be configured to support optical fibers coupled to the fiber array chip. The PCB may additionally be, for example, a flexible PCB.

In some embodiments, the PCB also includes thermal vias. The thermal vias are thermally coupled to the fiber array chip on one side of the PCB and thermally coupled to a thermal substrate disposed on an opposing side of the PCB. The substrate is, for example, a thermal spacer made out of a silicon or aluminum nitride substrate. In some embodiments, a cold plate is thermally coupled to the substrate and configured to remove heat from the pluggable optical fiber array that is generated by the fiber array chip and/or the PCB during operation of the pluggable optical fiber array.

In some embodiments, the pluggable optical fiber array also includes optical fibers that are optically coupled to one set of optical connections of the fiber array chip. The optical fibers are supported physically by the PCB (e.g., to reduce breakage), in some embodiments.

In some embodiments, the pluggable optical fiber array is optically coupled to another PIC to form an optical assembly. The pluggable optical fiber array is removably coupled (e.g., as an interchangeable component) to the PIC. To optically couple the pluggable optical fiber array with the PIC, optical waveguides of the fiber array chip are optically aligned with waveguides of the PIC.

In some embodiments, the optical assembly includes a substrate supporting the PIC. The substrate is, for example, an organic substrate (e.g., an organic PCB). In some embodiments, the fiber array chip is disposed between the substrate supporting the PIC and the thermal substrate coupled to the fiber array chip through the PCB supporting the fiber array chip.

In some embodiments, the PIC is electrically coupled to circuitry. As one non-limiting example, the circuitry includes an application-specific integrated circuit (ASIC). In some embodiments, the PIC is thermally coupled to a cold plate. The cold plate may be different than the cold plate coupled to the fiber array chip.

In some embodiments, a method of manufacturing an optical assembly is provided. The method includes bonding a fiber array chip to a PCB, the fiber array chip having a set of optical connections disposed on one edge of the fiber array chip and another set of optical connections disposed on another edge of the fiber array chip. The method also includes coupling optical fibers to one of the sets of optical connections disposed on the fiber array chip (e.g., such that the optical fibers are coupled to one edge of the fiber array chip).

In some embodiments, bonding the fiber array chip to the PCB includes making electrical connections between the fiber array chip and the PCB (i.e., so that the PCB can provide electrical power to one or more active devices on the fiber array chip). The fiber array chip may be electrically coupled to the PCB by, for example, solder bonding or thermocompression bonding. In some embodiments, the PCB is a flexible PCB In some embodiments, the optical fibers are coupled to the fiber array chip through an opening in the PCB (e.g., such that the fiber array chip and the optical fibers are disposed on opposing sides of the PCB). In other embodiments, the optical fibers and the fiber array chip are disposed on a same side of the PCB. In some embodiments, coupling the optical fibers to the fiber array chip includes coupling the optical fibers to v-grooves disposed on the fiber array chip. Coupling the optical fibers to the fiber array chip may, in some embodiments, couple one or more of the optical fibers to at least one active device (e.g., an active photonic and/or electronic device) disposed on the fiber array chip.

In some embodiments, the method also includes bonding a thermal substrate to the PCB. The thermal substrate is bonded to a side of the PCB opposing the fiber array chip (e.g., such that the PCB is disposed between the thermal substrate and the fiber array chip). The thermal substrate may be, for example, a silicon or aluminum nitride substrate. In some embodiments, a cold plate may be coupled to the thermal substrate. Because the thermal substrate is thermally coupled to the fiber array chips through one or more thermal vias disposed in the PCB, coupling the cold plate to the thermal substrate also thermally couples the cold plate to the fiber array chip.

In some embodiments, the method also includes optically coupling optical connections of the fiber array chip (e.g., different optical connections than the optical connections coupled to the optical fibers) to a PIC. The PIC is external to the fiber array chip, and optically coupling the fiber array chip to the PIC includes aligning the optical connections of the fiber array chip with optical waveguides disposed on the PIC. In some embodiments, to optically couple the fiber array chip and the PIC, edge couplers of the fiber array chip are aligned with edge couplers of the PIC.

Following below are more detailed descriptions of various concepts related to, and embodiments of, optical fiber arrays including active devices, optical assemblies including such optical fiber arrays, and methods of manufacture. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

I. Optical Fiber Array and Optical Assembly

Figure 3:
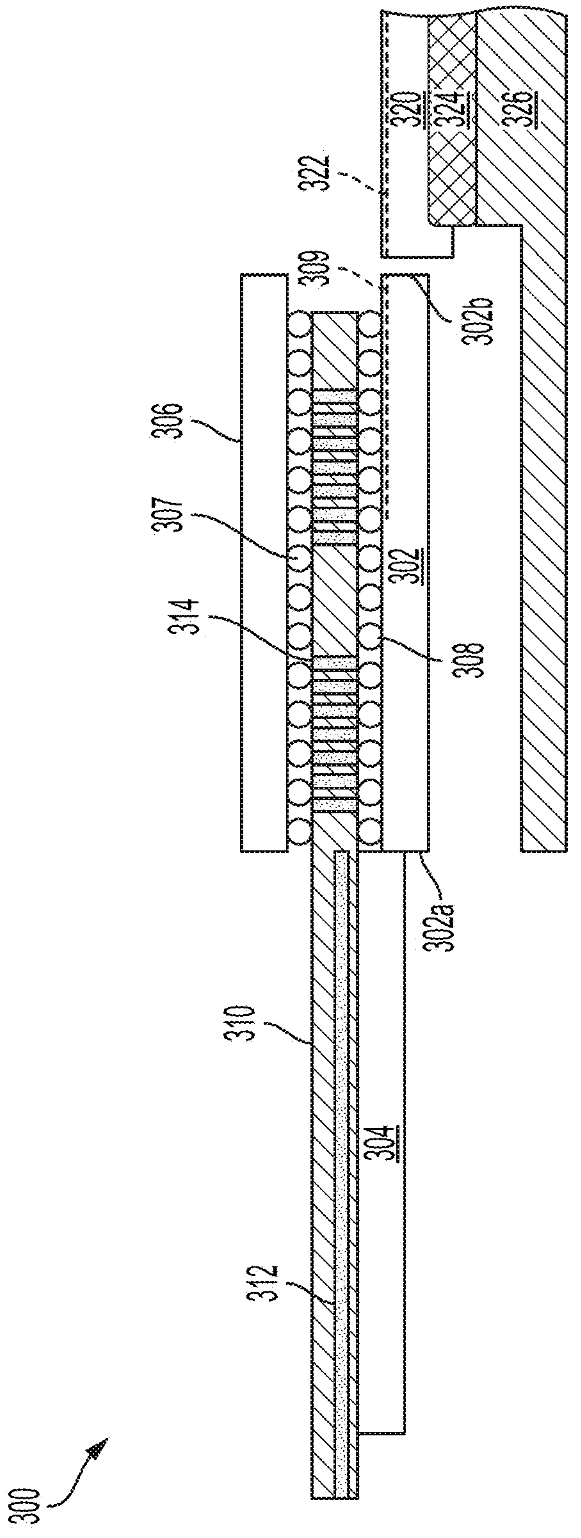
FIG. 3 is a schematic diagram of a cross-sectional view of an illustrative optical assembly including an optical fiber array coupled to a PIC, in accordance with some embodiments described herein.

FIG. 3 is a schematic diagram of a cross-sectional view of an illustrative optical assembly 300 including a pluggable optical fiber array coupled to a PIC 320, in accordance with some embodiments described herein. The optical assembly 300 includes a fiber array chip 302 coupled to a PCB 310, which may be a flexible PCB. The fiber array chip 302 is, in some embodiments, a PIC including one or more active devices (e.g., electrically powered photonic and/or electronic devices). The PCB 310 provides electrical power to the fiber array chip 302 through electrical connections 308 configured to electrically couple the metal interconnect 312 in the PCB 310 with the fiber array chip 302.

In some embodiments, the fiber array chip 302 includes a first edge 302*a* including optical connections configured to optically couple the fiber array chip 302 to the optical fibers 304. The optical connections coupling the fiber array chip 302 to the optical fibers 304 may be v-grooves, in some embodiments. The optical fibers 304 may be coupled to the fiber array chip 302 as an optical fiber array that is actively or passively aligned to the optical connections of the fiber array chip 302.

In some embodiments, the fiber array chip 302 also includes a second edge 302*b* including optical connections (e.g., edge couplers) configured to optically couple waveguides 309 disposed on the fiber array chip 302 to waveguides 322 disposed on the target PIC 320, thereby optically coupling the fiber array chip 302 to the PIC 320. The optical connections coupling the fiber array chip 302 to the PIC 320 may be edge couplers, in some embodiments. It should be appreciated that while the example of FIG. 3 shows the first edge 302*a* and the second edge 302*b* as disposed on opposing edges of the fiber array chip 302, in some embodiments the first edge 302*a* and the second edge 302*b* could be disposed on adjacent edges (e.g., edges that meet at a corner of the fiber array chip 302), as aspects of the technology described herein are not limited in this respect.

In some embodiments, the fiber array chip 302 is electrically coupled to the PCB 310 by electrical connections 308. Prior to coupling the fiber array chip 302 to the PCB 310, electrical bumps may be fabricated on the fiber array chip 302 at the wafer level. The electrical bumps may then be used to make electrical connections 308 between the fiber array chip 302 and electrical traces disposed on a surface of the PCB 310 (e.g., using solder reflow bonding and/or thermocompression bonding). Alternatively or additionally, the electrical coupling between the fiber array chip 302 and the PCB 310 may be implemented using a low temperature bonding process including, but not limited to, anisotropic conductive film (ACF) or anisotropic conductive paste (ACP). This low temperature process may help protect the integrity of the optical fibers 304. In some embodiments, after coupling the fiber array chip 302 to the PCB 310 the optical fibers 304 are fixed to a section of the PCB 310 for mechanical support. For example, the optical fibers 304 may be secured using an adhesive or other mechanical coupling technique.

In some embodiments, a thermal substrate 306 is also bonded to the PCB 310 (e.g., by connections 307, which may provide only mechanical coupling and/or electrical coupling between the thermal substrate 306 and the PCB 310). The thermal substrate 306 may be made of, for example, a silicon or an aluminum nitride substrate. The thermal substrate 306 may be bonded to the PCB 310 on an opposing side of the PCB 310 relative to the fiber array chip 302, and the fiber array chip 302 may be thermally coupled to the thermal substrate 306 by thermal vias 314 disposed in the PCB 310. In some embodiments, the thermal substrate 306 may be a thermal spacer configured to thermally couple the fiber array chip 302 to a cold plate, as described herein in connection with FIGS. 5A-5B.

In some embodiments, the pluggable optical fiber array (including the fiber array chip 302, thermal substrate 306, and PCB 310) is aligned and removably attached, either actively or passively, to an assembly including the PIC 320. The PIC 320 is mechanically supported by a substrate 326 and underfill 324 disposed between the PIC 320 and substrate 326. The substrate 326 may be, for example, an organic substrate (e.g., an organic PCB). Prior to operation of the optical assembly 300, the other end (not depicted) of the PCB 310 is connected to a separate board to provide electrical power and/or optical signals to the fiber array chip 302.

Figure 4A:
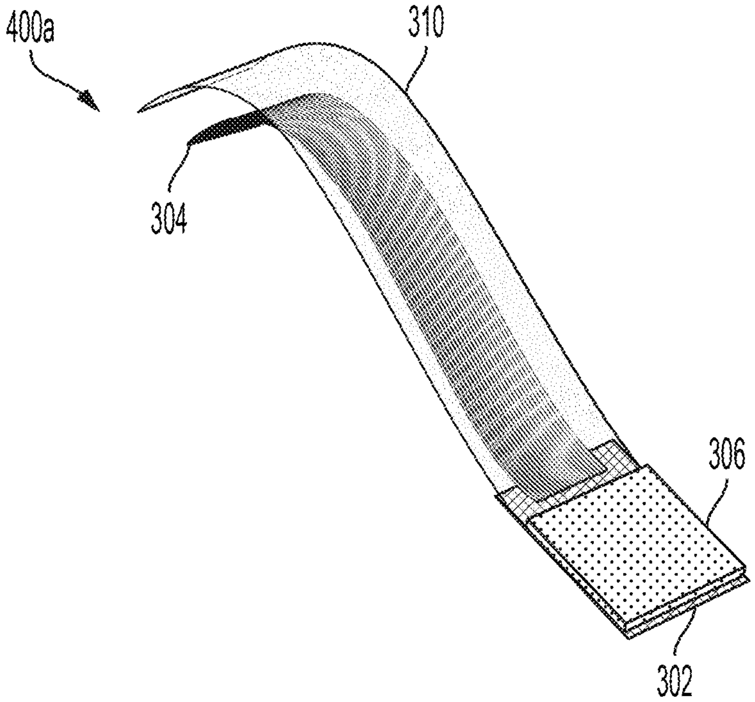
FIG. 4A is an elevation view of an example of an optical fiber array, in accordance with some embodiments described herein.
Figure 4B:
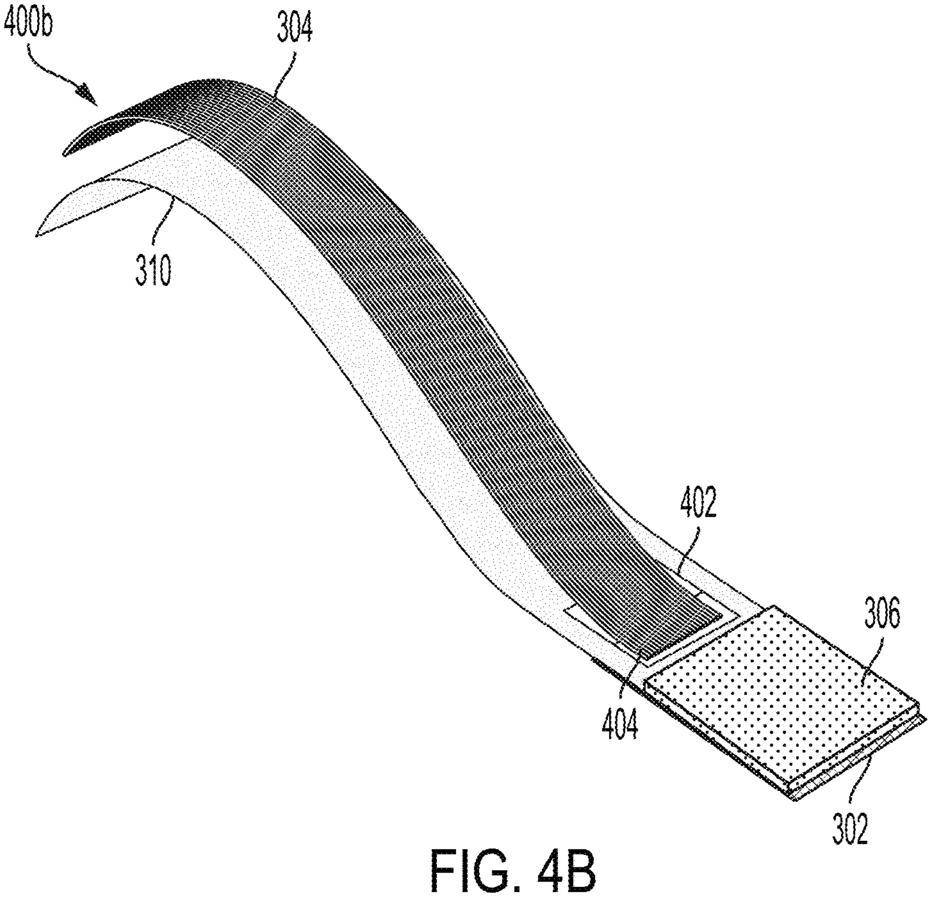
FIG. 4B is an elevation view of another example of an optical fiber array in which the optical fibers are coupled to the fiber array chip through an opening in the printed circuit board, in accordance with some embodiments described herein.

In some embodiments, the optical fibers 304 may be disposed on a same or opposing side of the PCB 310 relative to the fiber array chip 302. FIGS. 4A and 4B show examples of two such optical fiber arrays, 400*a* and 400*b*. Optical fiber array 400*a* includes optical fibers 304 that are first aligned and attached to the fiber array chip 302 prior to coupling of the PCB 310 to the fiber array chip 302. Subsequently, the PCB 310 is bonded to the top of the fiber array chip 302 using, for example, a low temperature ACF or ACP approach. Thereafter, the thermal substrate 306 is bonded to the opposing side of the PCB 310.

In contrast, optical fiber array 400*b* includes optical fibers 304 that are aligned and attached to the fiber array chip 302 after coupling of the PCB 310 to the fiber array chip 302. The fiber array chip 302 is bonded to the PCB 310 using, for example, higher temperature solder reflow and/or thermocompression processes which may safely be implemented in the absence of temperature-sensitive optical fibers. Thereafter, an opening 402 in the PCB 310 allows for alignment and attachment of the optical fibers 304 in fiber couplers 404 (e.g., v-grooves) of the fiber array chip 302. Electrical traces on the PCB 310 are routed around the opening 402.

Figure 5A:
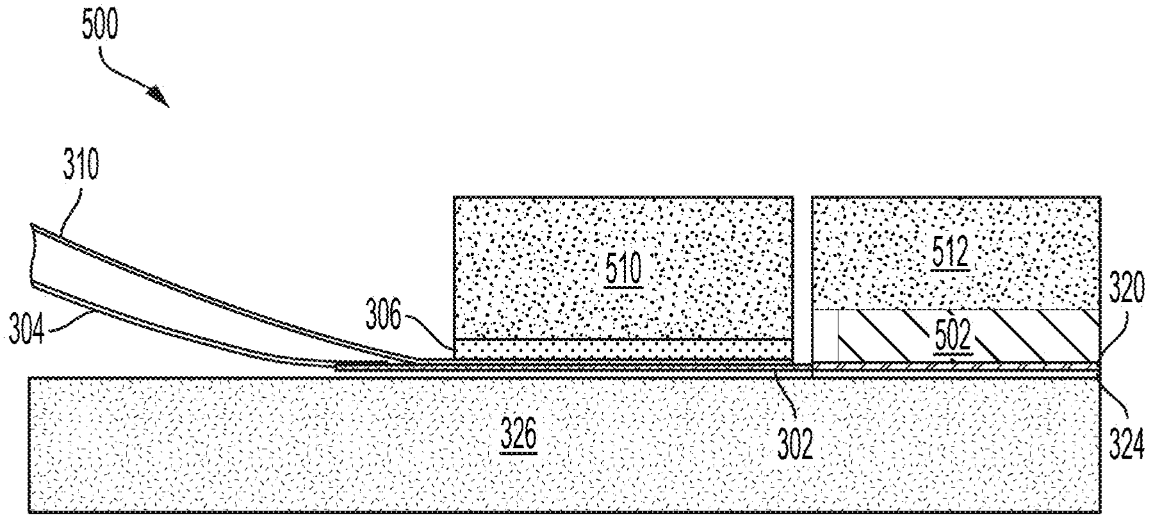
FIG. 5A is a schematic diagram of a cross-sectional view of another illustrative optical assembly including an optical fiber array coupled to a PIC, in accordance with some embodiments described herein.
Figure 5B:
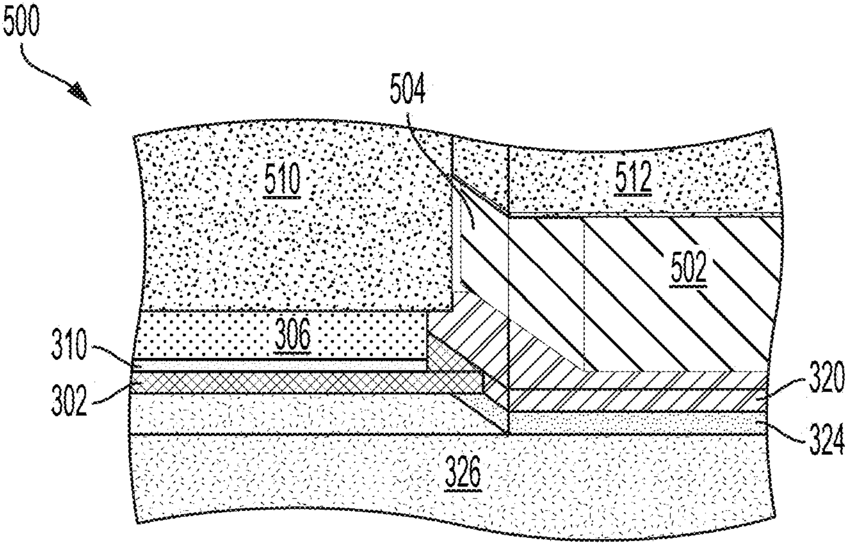
FIG. 5B is a schematic diagram of a detailed view of FIG. 5A, in accordance with some embodiments described herein.

In some embodiments, the fiber array chip 302 and/or the PIC 320 may be coupled to cold plates to provide temperature control during operation of the optical system. FIGS. 5A and 5B are schematic diagrams of an illustrative optical assembly 500 including systems to provide temperature control to active components in the assembly 500. As shown in FIGS. 5A and 5B, the fiber array chip 302 is edge coupled to the PIC 320 such that the fiber array chip 302 is disposed between the substrate 326 and the PCB 310.

In some embodiments, the PIC 320 is disposed inside a package. The PIC 320 is supported by a substrate 326 and underfill 324 disposed below the PIC 320 and coupled to circuitry 502 disposed above, and electrically connected to, the PIC 320. The circuitry 502 may be, for example, an application-specific integrated circuit (ASIC). The circuitry 502, PIC 320, and/or underfill 324 are encapsulated in an encapsulant 504 to form the package.

In some embodiments, the fiber array chip 302 is coupled to a first cold plate 510, and the PIC 320 is coupled to a second cold plate 512. The first cold plate 510 provides temperature control and structural support to the optical fiber array assembly (e.g., including the fiber array chip 302, the PCB 310, and the thermal substrate 306). The second cold plate 512 provides separate temperature control to the PIC 320. The use of two cold plates allows for two different cold zones to meet different temperature control requirements of the fiber array chip 302 and the assembly including the PIC 320 and circuitry 502.

In some embodiments, the fiber array chip 302 is coupled to a first heat sink (not depicted), and the PIC 320 is coupled to a second heat sink (not depicted), rather than being coupled to first and second cold plates. The first and second heat sinks may provide thermoregulation to the fiber array chip 302 and the PIC 320 via forced convection (e.g., a fan providing convective movement of air past the heat sinks).

Figure 19:
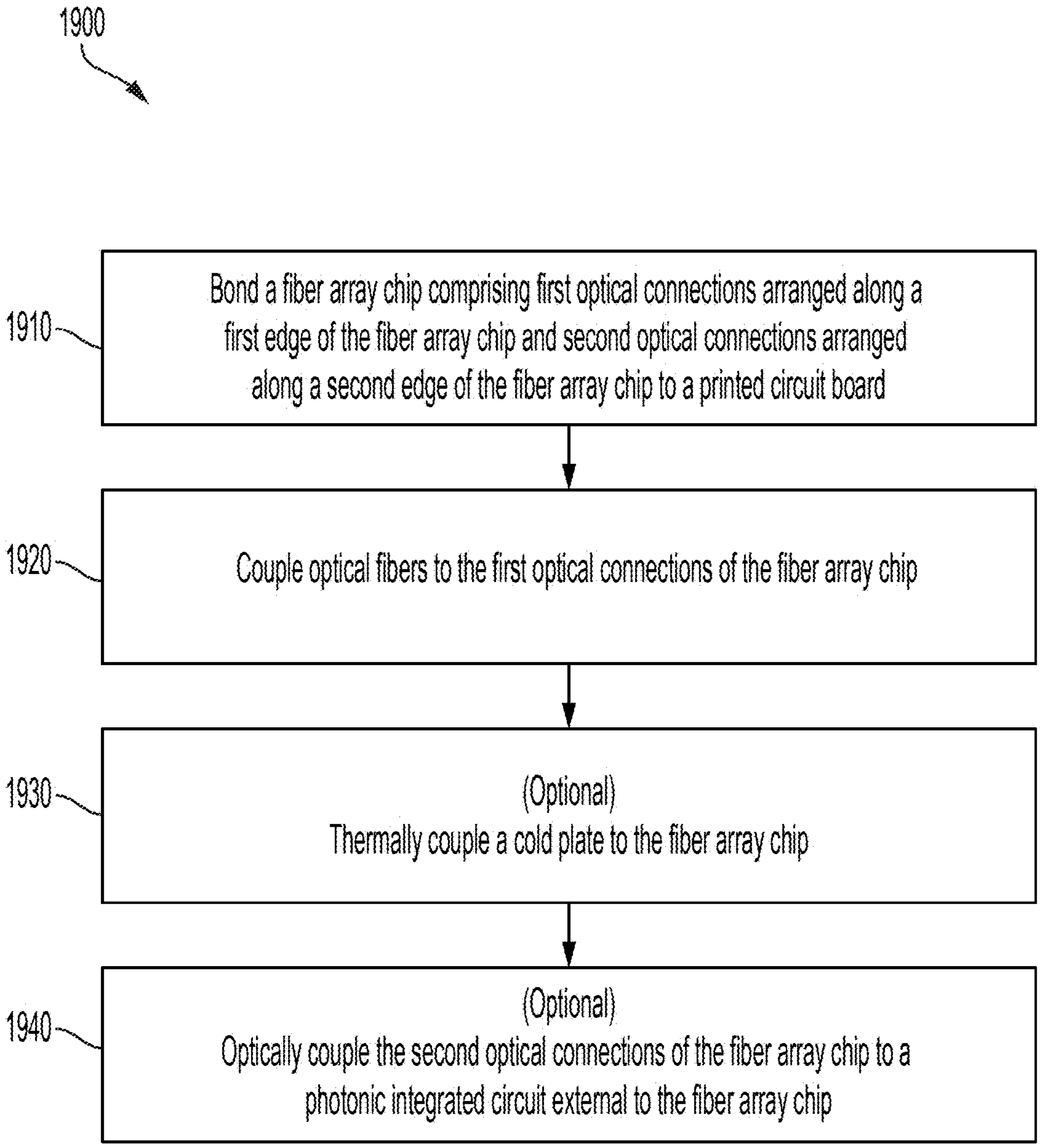
FIG. 19 is a flowchart describing a process 1900 of manufacturing an optical assembly including an optical fiber array, in accordance with some embodiments described herein.

FIG. 19 is a flowchart describing a process 1900 of manufacturing an optical assembly including an optical fiber array, in accordance with some embodiments described herein. Process 1900 may begin at act 1910, in which a fiber array chip is bonded to a PCB. The fiber array chip includes two sets of optical connections, each arranged along a different edge of the fiber array chip (e.g., arranged on opposing edges or adjacent edges of the fiber array chip).

In some embodiments, bonding the fiber array chip to the PCB is implemented by making electrical connections between the fiber array chip and the PCB, which may be a flexible PCB. For example, the fiber array chip may be bonded to the PCB using high temperature bonding techniques, including by not limited to solder bonding and/or thermocompression bonding. Alternatively or additionally, the fiber array chip may be bonded to the PCB using low temperature bonding techniques (e.g., if bonding occurs after coupling optical fibers to the fiber array chip), including but not limited to anisotropic conductive film (ACF) or anisotropic conductive paste (ACP) techniques.

In some embodiments, the process 1900 may include act 1920, in which optical fibers are coupled to a set of optical connections on the fiber array chip. Coupling the optical fibers to the fiber array chip may include coupling the optical fibers to fiber couplers (e.g., v-grooves) disposed on the fiber array chip. Coupling the optical fibers to the fiber array chip may also include optically coupling the optical fibers to one or more active devices (e.g., electrically powered photonic and/or electronic devices) disposed on the fiber array chip. In some embodiments, coupling the optical fibers to the first optical connections may include coupling the optical fibers to the first optical connections through an opening in the PCB.

Optionally, in some embodiments, process 1900 may include act 1930, in which a thermal substrate is bonded to the PCB. The thermal substrate is bonded to a side of the PCB opposing the fiber array chip. The thermal substrate may be made of, for example, a silicon substrate or an aluminum nitride substrate to the PCB. In some embodiments, a cold plate may be coupled to the thermal substrate, and the thermal substrate may thermally couple a cold plate to the fiber array chip through thermal vias disposed in the PCB. In some embodiments, the fiber array chip is cooled using a heat sink and forced convection (e.g., generated by a fan).

Optionally, in some embodiments, process 1900 may include act 1940, in which another set of optical connections of the fiber array chip are coupled to a PIC that is external to the fiber array chip. Optically coupling this set of optical connections to the PIC includes aligning the optical connections with optical waveguides disposed on the PIC. Additionally or alternatively, optically coupling the this set of optical connections to the PIC comprises aligning edge couplers of the fiber array chip with edge couplers of the PIC.

II. Active Fiber Array Chip Components

The inventors have recognized and appreciated that the fiber array chip as described herein (e.g., fiber array chip 302) may include a variety of active photonic and/or electrical components that can be arranged to provide flexible and unique functionality of the pluggable optical fiber array. For example, by providing electrical power to the fiber array chip, it is possible to power lasers, semiconductor optical amplifiers (SOAs), reflective semiconductor optical amplifiers (RSOAs), active modulation components, temperature monitors, optical power monitors, and other circuits and systems housed within the optical fiber array. Examples of active devices and arrangements of active devices are provided in connection with FIGS. 6-18 herein, although it should be appreciated that such devices may be used in any combination of two or more devices and/or circuitry blocks if they are not mutually inconsistent, as such combinations are included within the scope of the present disclosure.

Figure 6:
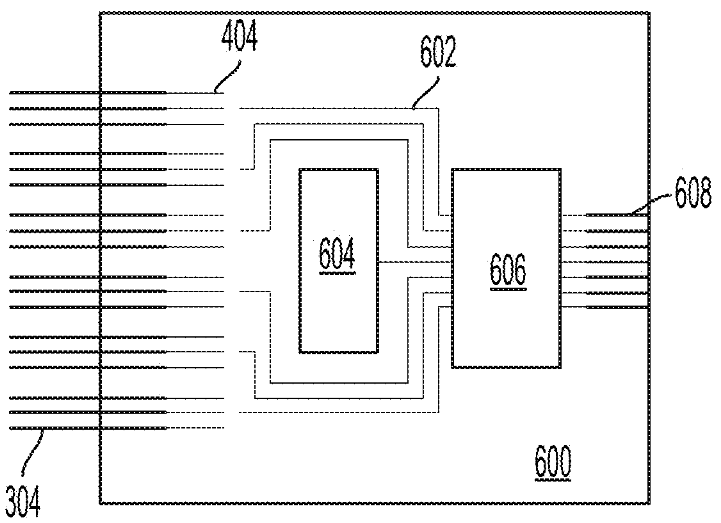
FIG. 6 is a schematic diagram of an example of a fiber array chip including active devices including a laser array and photonic and electronic devices, in accordance with some embodiments described herein.

FIG. 6 is a schematic diagram of an example of a fiber array chip 600 including a laser array 604 and photonic and electronic devices 606, in accordance with some embodiments described herein. The fiber array chip 600 may be configured to receive optical signals as input (e.g., from optical fibers 304) and to manipulate the received optical signals using photonic and electronic devices 606 and/or optical signals generated by the laser array 604. For example, the photonic and electronic devices 606 may be configured to encode one or more values into parameters of the received optical signals to generate output optical signals. In some embodiments, the photonic and electronic devices 606 may include active devices including, for example, photonic and/or electrical circuits and/or photodetectors.

In some embodiments, the devices 606 may include amplifier or gain media (e.g., semiconductor optical amplifiers (SOAs)) configured to amplify signals propagating from waveguides 602 towards edge couplers 608 and/or simultaneously amplifying signals propagating from edge couplers 608 to waveguides 602. In some cases, devices 606 may also include optical switching elements such as an array of Mach-Zehnder Interferometer (MZI) switches that can route signals between waveguides 602 and edge couplers 608.

In some embodiments, the fiber array chip 600 includes fiber couplers 404 that can be used to couple the fiber array chip 600 to optical fibers 304. The fiber couplers 404 are optically coupled to the photonic and electronic devices 606 by optical waveguides 602, thereby optically coupling the optical fibers 304 to the photonic and electronic devices 606. In some embodiments, outputs of the laser array 604 are also coupled to the photonic and electronic devices 606 by one or more optical waveguides.

In some embodiments, the fiber array chip 600 includes edge couplers 608 configured to couple the fiber array chip 600 to another optical device (e.g., to an external PIC). The edge couplers 608 may be optically coupled to outputs of the photonic and electronic devices 606 and may therefore couple outputs of the photonic and electronic devices 606 to the external PIC. In some embodiments, the spacing (e.g., the pitch) of the edge couplers 608 may be smaller than the pitch of fiber couplers 404. For example, the pitch of the edge couplers 608 may be approximately 50 μm while the fiber couplers 404 may have a pitch configured to support standard single mode fiber diameters (e.g., approximately 127 μm).

Figure 7:
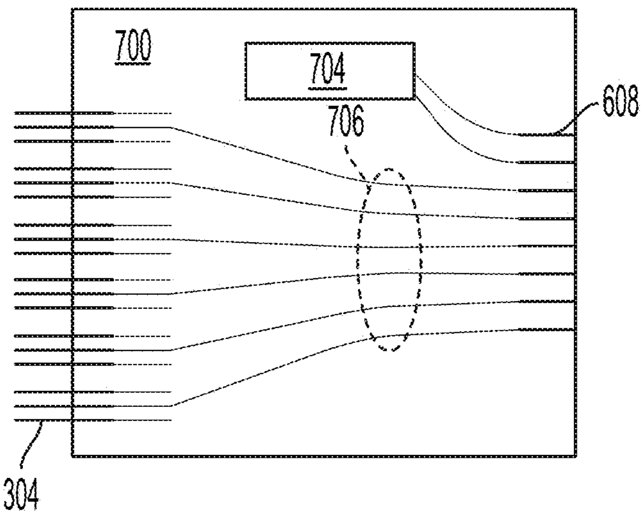
FIG. 7 is a schematic diagram of an example of a fiber array chip including active devices including a laser array, in accordance with some embodiments described herein.

FIG. 7 is a schematic diagram of an example of a fiber array chip 700 including a laser array 704, in accordance with some embodiments described herein. The fiber array chip 700 is coupled to optical fibers 304 at one edge of the fiber array chip 700 (e.g., by fiber couplers 404). The fiber array chip 700 includes waveguides coupling the optical fibers 304 to edge couplers 608, which are configured to optically couple the fiber array chip 700 to an external PIC. The fiber array chip 700 includes a waveguide pitch reduction 706 to reduce the pitch of the optical fiber optical fibers 304 to a pitch appropriate for waveguides on the external PIC. In this manner, the fiber array chip 700 may act as an optical passthrough for signals coming from the optical fibers 304.

In some embodiments, the fiber array chip 700 also includes a laser bank 704. The laser array 704 includes one or more lasers configured to generate optical signals. These generated optical signals may also be coupled to the external PIC using edge couplers 608. In this manner, the fiber array chip 700 may also act as an off-chip laser for an optical system including the external PIC.

Figure 8:
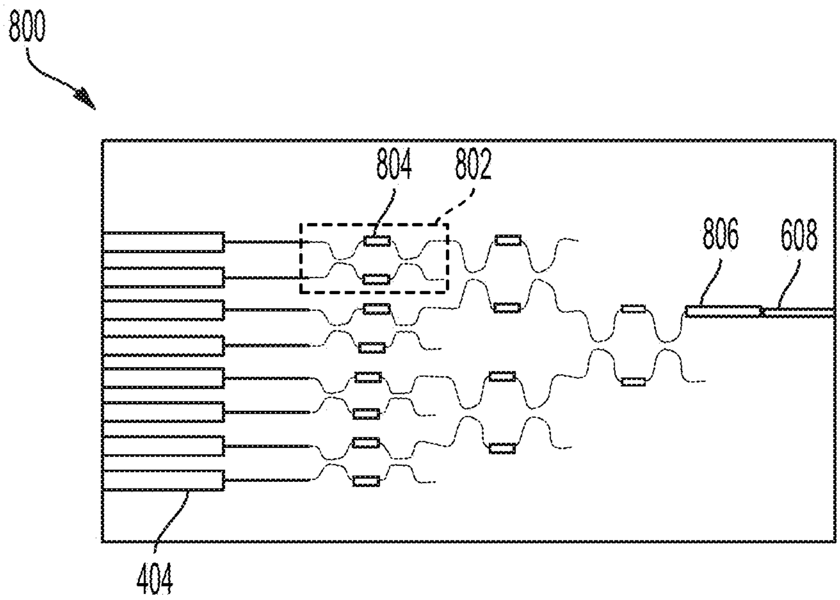
FIG. 8 is a schematic diagram of an example of a fiber array chip including active devices including a multiplexer and a semiconductor optical amplifier (SOA), in accordance with some embodiments described herein.

FIG. 8 is a schematic diagram of an example of a fiber array chip 800 including Mach-Zehnder interferometers 802 and an SOA 806, in accordance with some embodiments described herein. The fiber array chip 800 includes fiber couplers 404 configured to couple the fiber array chip 800 to external optical fibers (not depicted). The optical signals received from the external optical fibers are then routed through a network of Mach-Zehnder interferometers 802 configured to perform multiplexing. The Mach-Zehnder interferometers 802 are configured to pass signals from the edge coupler 608 to be routed to multiple optical fibers and vice versa. The Mach-Zehnder interferometers 802 include active components 804 (e.g., heaters) configured to provide tunable control of the Mach-Zehnder interferometers 802 (e.g., to provide phase control to implement the multiplexing functionality of the network of Mach-Zehnder interferometers 802). In some embodiments, wavelength division multiplexing (WDM) may be implemented using Mach-Zehnder interferometers 802 having unbalanced arms and/or by using resonant devices (e.g., ring resonators, racetrack resonators).

In some embodiments, a single multiplexed optical signal is output from the network of Mach-Zehnder interferometers 802 to an SOA 806. The SOA 806 is configured to amplify the optical signal received from the network of Mach-Zehnder interferometers 802 (e.g., to counteract optical loss introduced by the network of Mach-Zehnder interferometers 802). The amplified optical signal from the SOA 806 may then be coupled out from the fiber array chip 800 to an external PIC by a single edge coupler 608.

Figure 9:
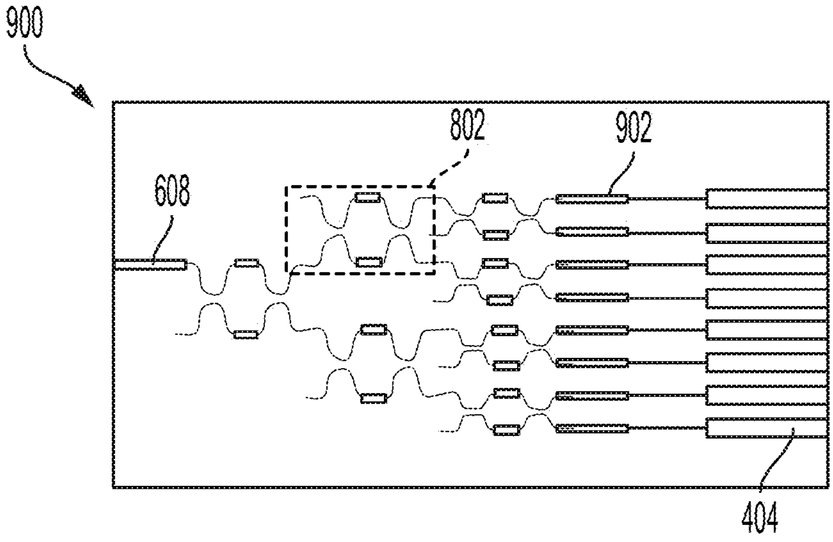
FIG. 9 is a schematic diagram of an example of a fiber array chip including active devices including a multiplexer and a semiconductor optical amplifier (SOA), in accordance with some embodiments described herein.

FIG. 9 is a schematic diagram of an example of a fiber array chip 900 including Mach-Zehnder interferometers 802 arranged to perform demultiplexing and SOAs 902, in accordance with some embodiments described herein. In fiber array chip 900, a multiplexed input optical signal is coupled to the fiber array chip 900 by a single edge coupler 608. In contrast to other fiber array chips described above, the received input optical signal is received from an external PIC and output to optical fibers through fiber couplers 404.

In some embodiments, during operation of the fiber array chip 900, the received input optical fiber includes a number of multiplexed optical signals (e.g., multiplexed using WDM). The multiplexed signal may be demultiplexed using a network of Mach-Zehnder interferometers 802. The demultiplexed signals may then be passed from the demultiplexing network of Mach-Zehnder interferometers 802 to corresponding SOAs 902. The SOAs may be configured to amplify each of the demultiplexed optical signals (e.g., to counteract photonic losses introduced by the network of Mach-Zehnder interferometers 802). The amplified, demultiplexed optical signals may then be output to external optical fibers from the fiber array chip 900 by fiber couplers 404.

Figure 10:
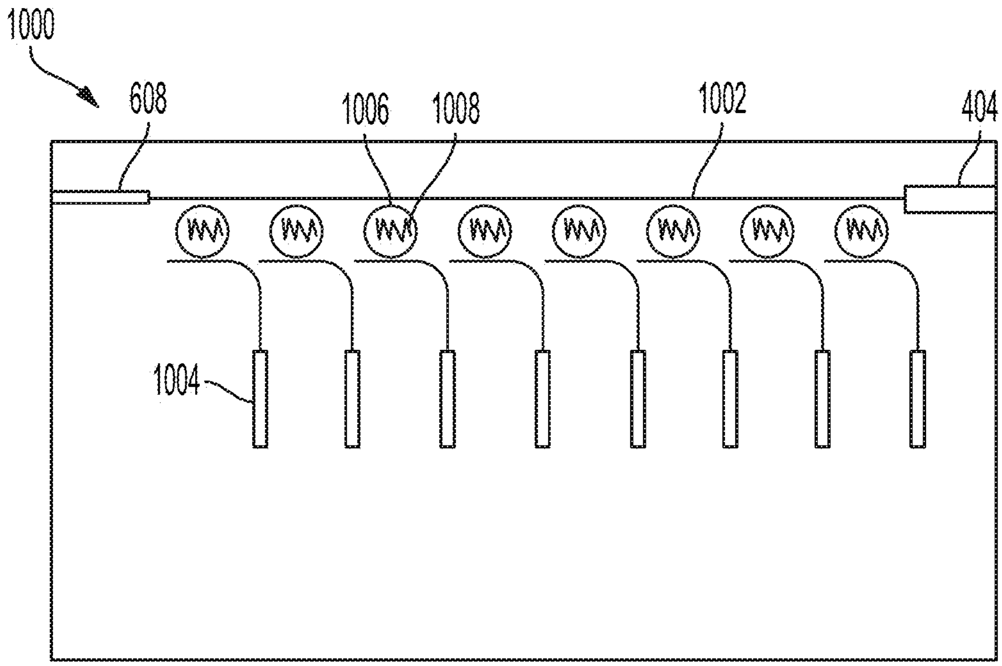
FIG. 10 is a schematic diagram of an example of a fiber array chip including active devices including lasers having different wavelengths and optical combiners configured to route outputs of the lasers to an optical bus, in accordance with some embodiments described herein.

FIG. 10 is a schematic diagram of an example of a fiber array chip 1000 including lasers 1004 and optical combiners 1006, in accordance with some embodiments described herein. The fiber array chip 1000 includes an optical bus 1002 coupled between an input and an output. As shown in the example of FIG. 10, the optical bus 1002 is coupled between an edge coupler 608 (e.g., to provide input to the fiber array chip 1000 from an external PIC) and a fiber coupler 404 (e.g., to provide output from the fiber array chip 1000 to an optical fiber). However, it should be appreciated that the fiber array chip 1000 may be, in some embodiments, provided input from an optical fiber and provide output to an external PIC, as aspects of the technology are not limited in this respect.

In some embodiments, the fiber array chip 1000 includes a number of lasers 1004. The lasers 1004 are configured to generate optical signals having different wavelengths. The lasers 1004 have outputs that are optically coupled to the optical bus 1002 by optical combiners 1006. As shown in the example of FIG. 10, the optical combiners 1006 may be ring resonators configured to pass the generated optical signals from the lasers 1004 to the optical bus 1002. The ring resonators may be tuned to be resonant to the wavelength of light generated by the respective laser 1004. In some embodiments, the optical combiners 1006 include heaters 1006 or other active electrical components to tune the resonant wavelength of the optical combiners 1006.

Figure 11B:
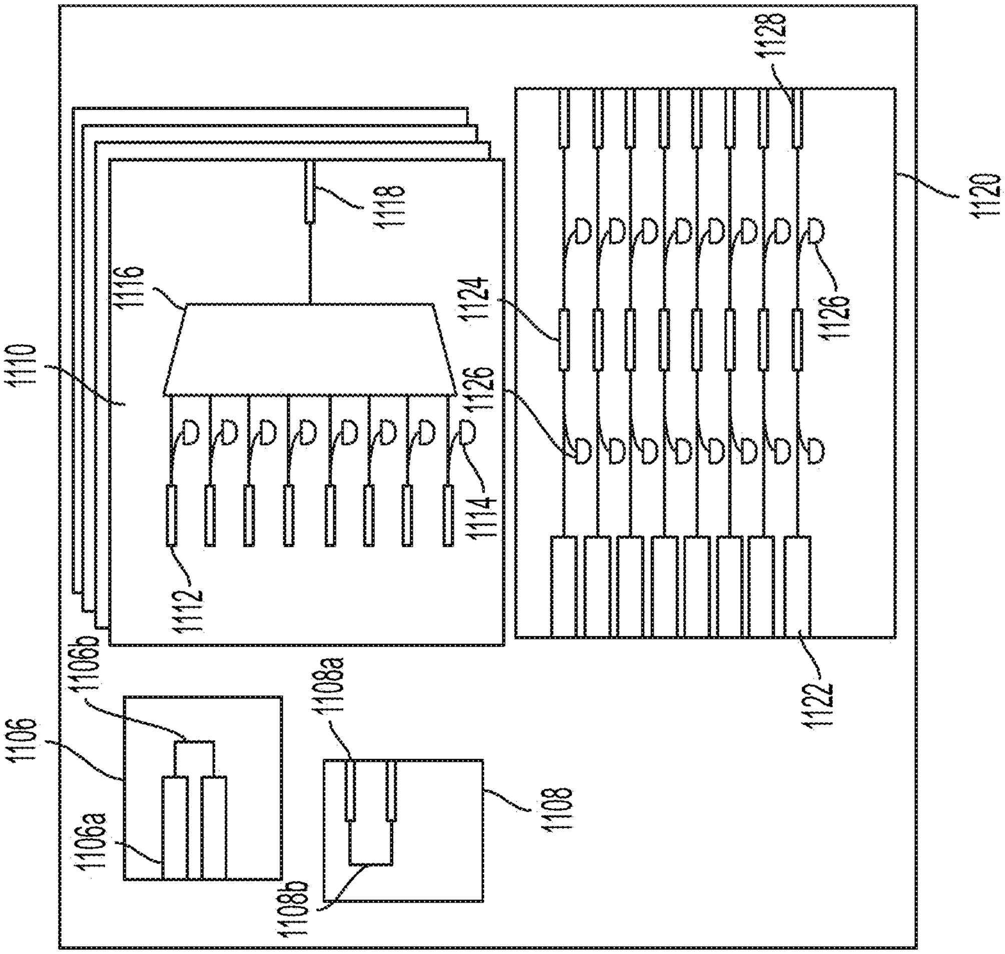
FIG. 11B is a collection of schematic diagrams of components included on the fiber array chip of FIG. 11A, in accordance with some embodiments described herein.
Figure 11A:
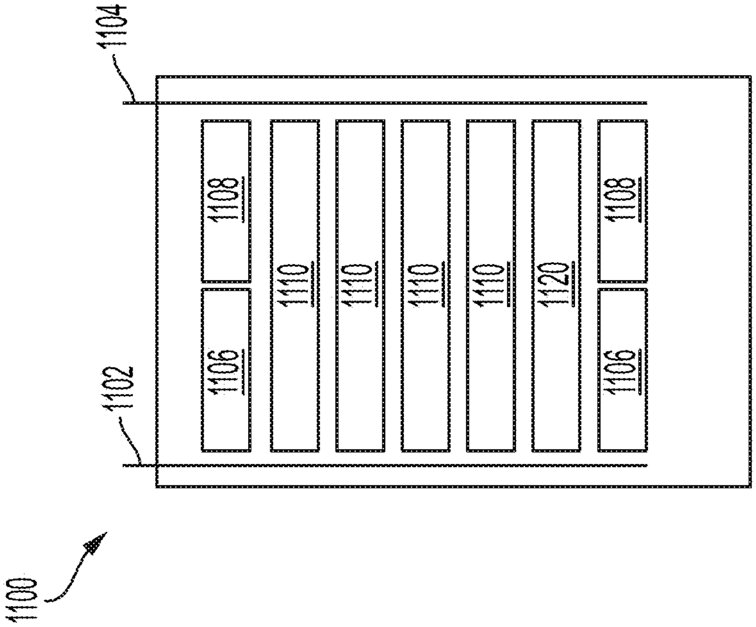
FIG. 11A is a block diagram of an example of a fiber array chip including active devices including laser and SOA arrays, in accordance with some embodiments described herein.

In some embodiments, the fiber array chip may be modularly arranged to include a number of component banks. FIG. 11A is a block diagram of an example of a fiber array chip 1100 including laser arrays 1110 and SOA arrays 1120, in accordance with some embodiments described herein. FIG. 11B shows schematic diagrams of the various components laid out in the fiber array chip 1100.

In some embodiments, the fiber array chip 1100 includes input optical couplers 1102 and output optical couplers 1104. The fiber array chip 1100 includes several laser arrays 1110 coupled between the optical connections 1102 and the optical connections 1104. As shown in FIG. 11B, the laser arrays 1110 each include a number of lasers 1112 (e.g., eight, but fewer or more lasers may be provided per laser array, as aspects of the technology are not limited in this respect). The laser arrays 1110 may also include photodetectors 1114 coupled to outputs of each of the lasers 1112 (e.g., to monitor output wavelengths and/or intensity of light generated by each of the lasers 1112).

In some embodiments, optical signals output from the lasers 1112 are optionally multiplexed into a single optical signal by wavelength division multiplexer 1116. The WDM 1116 may be, for example, an arrayed waveguide grating (AWG) and/or a network of Mach-Zehnder interferometers, as described in connection with FIG. 8 herein. The single optical signal output by WDM 1116 may then be output from the fiber array chip 1100 by edge coupler 1118.

In some embodiments, the fiber array chip 1100 also includes a SOA array 1120. The SOA array 1120 may be configured to act as a passthrough providing optical amplification to signals passing through the fiber array chip 1100. The SOA array 1120 includes fiber couplers 1122 optically coupled to edge couplers 1128 by SOAs 1124. Photodetectors 1126 are provided to monitor outputs of the SOAs 1124 in either direction such that the SOA array 1120 may be operated in either direction (e.g., with inputs passing from left to right or vice versa, from right to left).

In some embodiments, the fiber array chip 1100 also includes fiber loopbacks 1106. The fiber loopbacks 1106 include pairs of fiber couplers 1106*a* optically coupled by a waveguide 1106*b* on the fiber array chip 1100. The fiber loopbacks 1106 are configured to route an input signal from an optical fiber back out to another optical fiber.

In some embodiments, the fiber array chip 1100 also includes edge coupler loopbacks 1108. The edge coupler loopbacks 1108 include pairs of edge couplers 1108*a* optically coupled by a waveguide 1108*b* on the fiber array chip 1100. The edge coupler loopbacks 1108 are configured to route an input signal from an external PIC back out of the fiber array chip 1100 to another waveguide of the external PIC.

Figure 13:
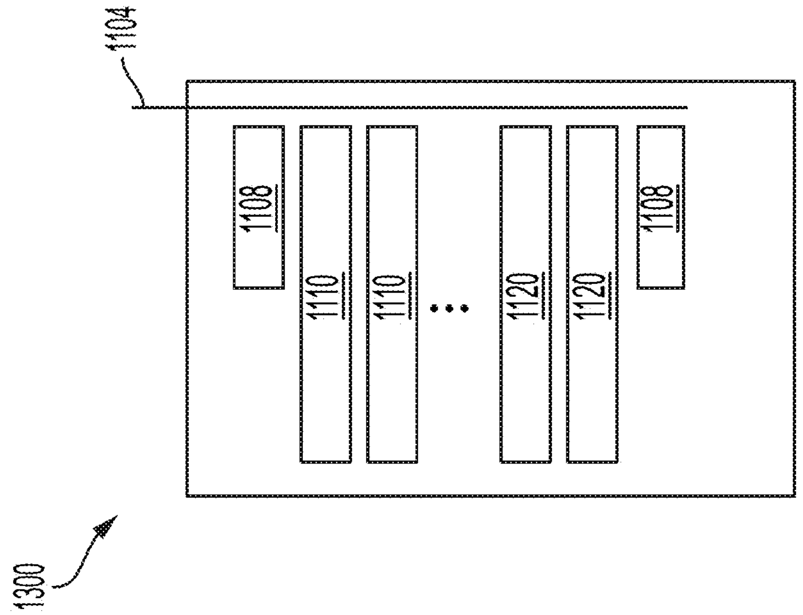
FIG. 13 is a block diagram of an example of a fiber array chip including active devices including laser arrays, in accordance with some embodiments described herein.
Figure 12:
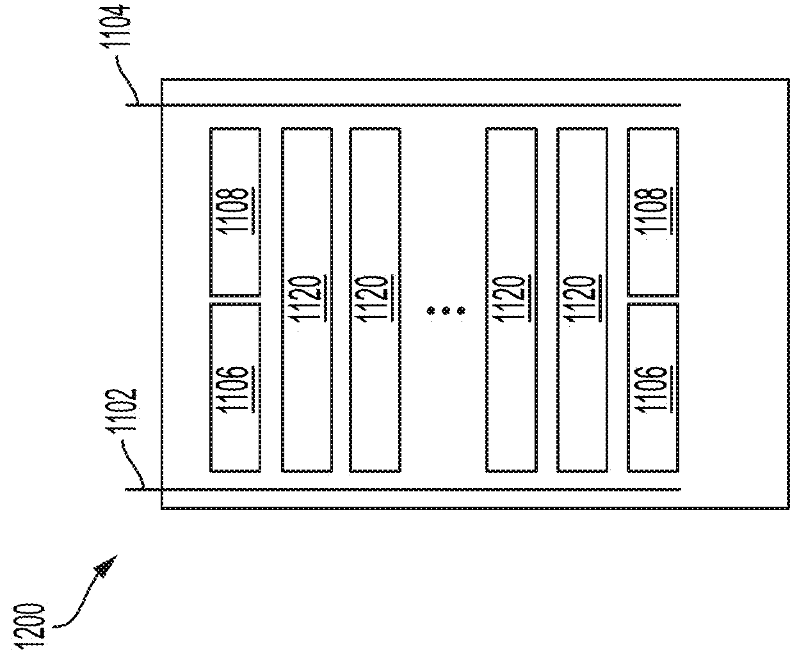
FIG. 12 is a block diagram of an example of a fiber array chip including active devices including SOA arrays, in accordance with some embodiments described herein.

It should be appreciated that while fiber array chip 1100 is depicted as including four laser arrays with eight lasers each, one SOA array with eight SOA channels, and four loopbacks, that in some embodiments the number of one or more of these components may be varied, as aspects of this technology are not limited in this respect. As shown in FIGS. 12 and 13, for example, the fiber array chip may be configured to include only SOA arrays or only laser arrays.

FIG. 12 is a block diagram of an example of a fiber array chip 1200 including a plurality of SOA arrays 1120, in accordance with some embodiments described herein. The fiber array chip 1200 is configured to act as a SOA passthrough from external optical fibers to an external PIC coupled to the fiber array chip 1200.

FIG. 13 is a block diagram of an example of a fiber array chip 1300 including laser arrays 1110, in accordance with some embodiments described herein. The fiber array chip 1300 is configured to act as an external cavity laser (ECL) to provide laser signals to an external PIC. The example of fiber array chip 1300 includes only edge coupler loopbacks 1108 and does not include fiber loopbacks 1106.

Figure 14:
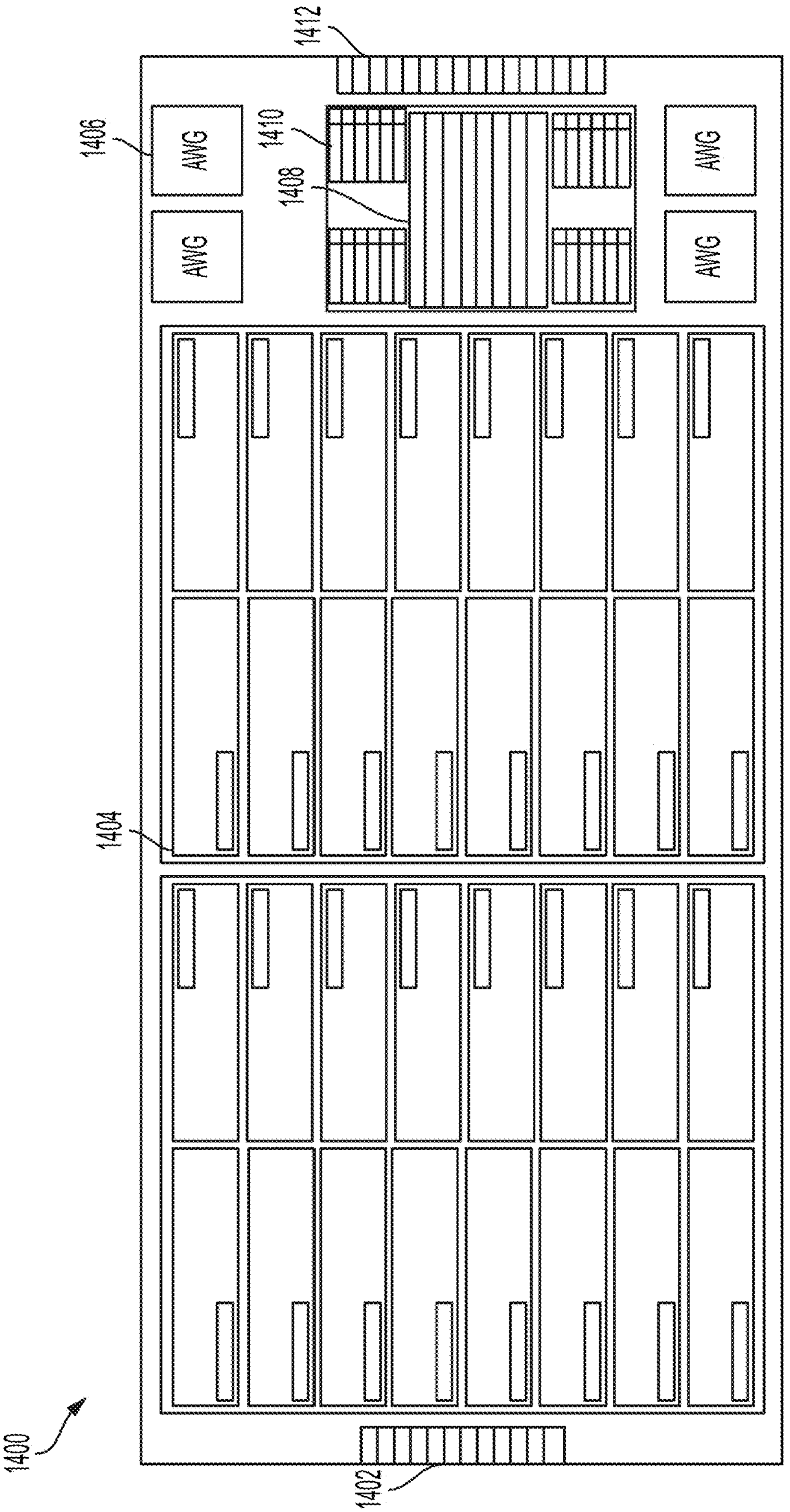
FIG. 14 is a schematic diagram of an example of a fiber array chip including arrayed waveguide gratings and active devices including laser and SOA arrays and monitoring photodetectors (MPDs), in accordance with some embodiments described herein.

FIG. 14 is a schematic diagram of an example layout of a fiber array chip 1400 including AWGs 1406, lasers 1404, and SOAs 1408, in accordance with some embodiments described herein. The fiber array chip 1400 includes a plurality of lasers 1404. The output optical signals of each laser 1404 is monitored by a photodetector. The lasers 1404 may be arranged in arrays of eight lasers, and the output of each laser array is multiplexed by a respective AWG 1406. Additional monitoring photodetectors may be provided to monitor signals output by the AWGs 1406 (e.g., a monitoring photodetector may be coupled to outputs of each AWG 1406).

The fiber array chip 1400 also includes fiber couplers 1402 configured to optically couple input optical signals from optical fibers to the SOAs 1408. The SOAs 1408 are configured to amplify the optical signals received from the optical fibers prior to output at edge couplers 1412 (or vice versa, as the SOAs 1408 may act as a passthrough from the edge couplers 1412 to the fiber couplers 1402, in some embodiments). Monitoring photodetectors 1410 may be provided to monitor output optical signals from the SOAs 1408 (e.g., a monitoring photodetector 1410 may be provided on an input and an output of each SOA 1408).

Figure 15:
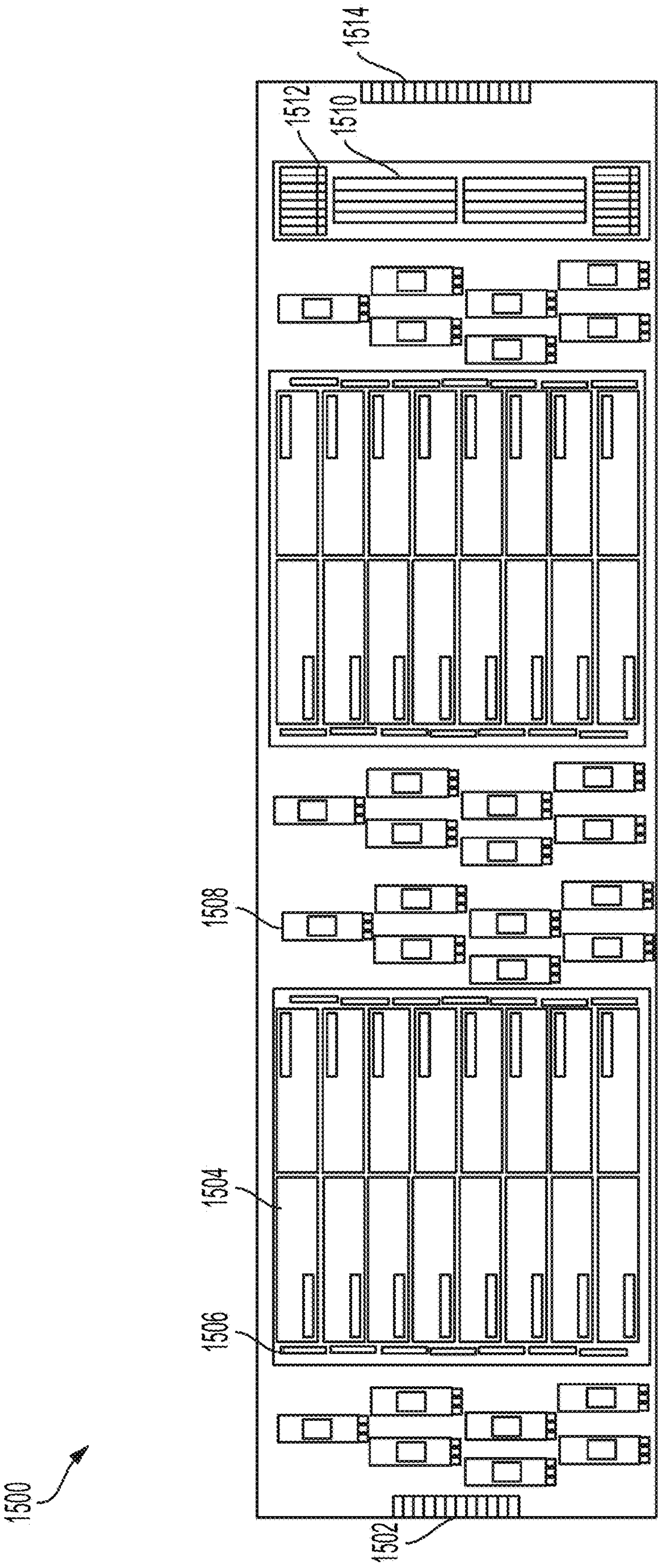
FIG. 15 is a schematic diagram of an example of a fiber array chip including active devices including laser and SOA arrays, Mach-Zehnder multiplexers, and MPDs, in accordance with some embodiments described herein.

FIG. 15 is a schematic diagram of an example layout of a fiber array chip 1500 including lasers 1504, SOAs 1510, Mach-Zehnder interferometer (MZI) multiplexers 1508, in accordance with some embodiments described herein. The fiber array chip 1500 includes a plurality of lasers 1504. The output optical signals of each laser 1504 is monitored by a photodetector (not depicted). The lasers 1504 may be arranged in arrays of eight lasers, and the output of each laser array may be multiplexed by a respective MZI multiplexer 1508, which is a network of MZIs configured to multiplex input optical signals into a single output optical signal (e.g., using WDM). Additional monitoring photodetectors may be provided to monitor signals output by the MZI multiplexers 1508 (e.g., a monitoring photodetector may be coupled to outputs of each MZI multiplexer 1508).

The fiber array chip 1500 also includes fiber couplers 1502 configured to optically couple input optical signals from optical fibers to the SOAs 1510. The SOAs 1510 are configured to amplify the optical signals received from the optical fibers prior to output at edge couplers 1514 (or vice versa, as the SOAs 1510 may act as a passthrough from the edge couplers 1514 to the fiber couplers 1502, in some embodiments). Monitoring photodetectors 1512 may be provided to monitor output optical signals from the SOAs 1510 (e.g., a monitoring photodetector 1512 may be provided on an input and an output of each SOA 1510).

Figure 16A:
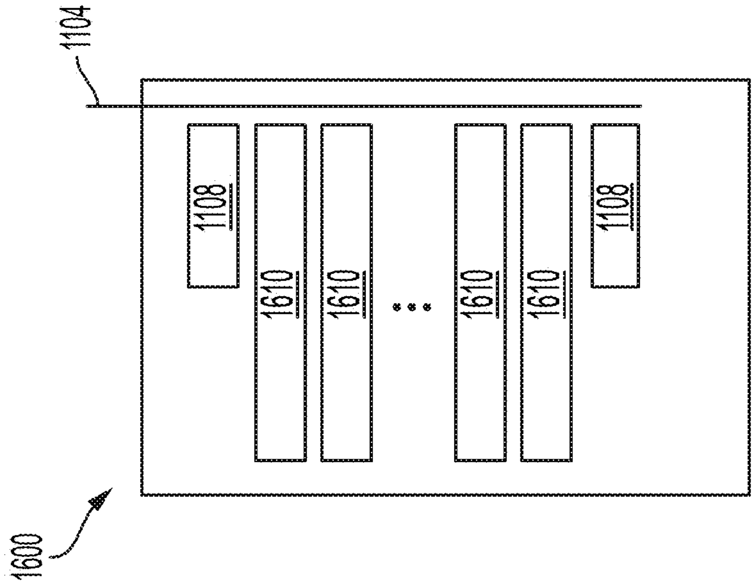
FIG. 16A is a block diagram of an example of a fiber array chip including active devices including RSOA arrays, in accordance with some embodiments described herein.

In some embodiments, the fiber array chip may be configured as an ECL, examples of which are provided in connection with FIGS. 16A-18 herein. FIG. 16A is a block diagram of an example of a fiber array chip 1600 configured as an ECL using RSOA arrays 1610. FIG. 16B shows schematic diagrams of components included on the fiber array chip 1600.

In some embodiments, the fiber array chip 1600 includes a plurality of RSOA arrays 1610. The fiber array chip 1600 also includes two edge coupler loopbacks 1108, as described in connection with FIGS. 11A and 11B. The RSOA arrays 1610 include edge couplers 1612 configured to optically couple the RSOA array 1610 to an external PIC. The RSOA arrays 1610 also includes SOAs 1614 and reflectors 1618 coupled to the edge couplers 1612.

During operation of the RSOA arrays 1610, in some embodiments, optical signals may be received from the external PIC and routed by the edge couplers 1612 to the SOAs 1614 to perform a first amplification of the light. The light is then reflected by the reflectors 1618 and passes through the SOAs 1614 again, for further amplification before being output from the edge couplers 1612. The edge couplers 1612 may be manufactured with a faceted edge (e.g., having a face tilted an at angle relative to a cleaved face of the substrate supporting the RSOA arrays 1610). In some embodiments, the facet of the edge couplers 1612 may be alternatively or additionally coated with an anti-reflective coating to reduce unintended reflections within the laser cavity of the fiber array chip 1600.

Figure 16B:
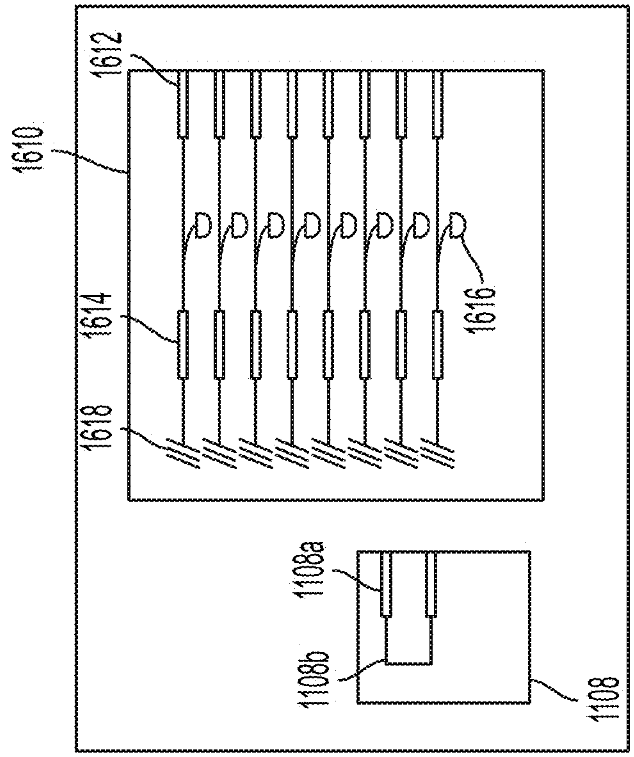
FIG. 16B is a collection of schematic diagrams of components included on the fiber array chip of FIG. 16A, in accordance with some embodiments described herein.

In some embodiments, photodetectors 1616 are provided to monitor the output optical signals from the SOAs 1614. It should be appreciated that while the example of FIGS. 16A and 16B depicts RSOA arrays 1610 as including eight sets of RSOA devices, the RSOA arrays 1610 may include additional or fewer RSOA devices in some embodiments, as aspects of the technology are not limited in this respect.

Figure 17:
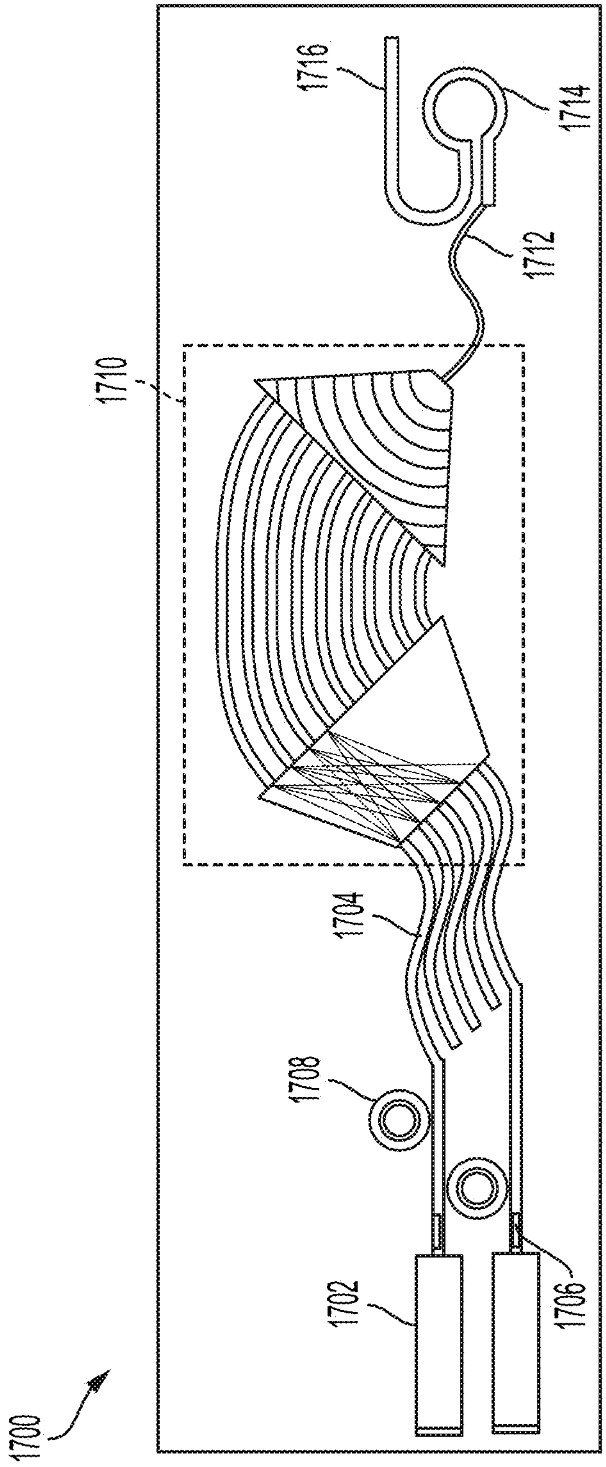
FIG. 17 is a schematic diagram of an example of an external cavity laser (ECL), including RSOAs and an AWG, which could be incorporated into a fiber array chip, in accordance with some embodiments described herein.

FIG. 17 is a schematic diagram of an example of a fiber array chip 1700 configured as an ECL, including RSOA arrays 1702 and an AWG 1710, in accordance with some embodiments described herein. The RSOA arrays 1702 may be the same as RSOA arrays 1610 as described in connection with FIGS. 16A-16B herein. The RSOA arrays 1702 are coupled to the AWG 1710 by waveguides 1704.

In some embodiments, the fiber array chip 1700 also includes ring resonators 1708 coupled to the waveguides 1704. The ring resonators 1708 are configured to act as drop-port rings that pass only a single wavelength to the waveguides 1704. The ring resonators 1708, and waveguides 1704, 1712, and 1714, may be made out of silicon or silicon nitride components. Tunable heaters 1706 may be included adjacent the ring resonators 1708 to provide phase modulation of the signals passed to and returned from the RSOA arrays 1702 to enable multiplexing through the AWG 1710. In some embodiments, the AWG 1710 may be made out of silicon nitride components (e.g., silicon nitride prisms and/or waveguides).

In some embodiments, during operation of the fiber array chip 1700, light may enter the fiber array chip 1700 from the edge coupler 1716 and pass through waveguide structures 1714, 1712 prior to entering the AWG 1710 for demultiplexing. The demultiplexed optical signals are then output from the AWG 1710 to waveguides 1704, where they are filtered by ring resonators 1708 and passed to RSOA arrays 1702 for reflection and amplification. The signals are then output from the RSOA arrays 1702 and returned to the AWG 1710 for multiplexing (e.g., performed within the laser cavity) prior to output from the edge coupler 1716.

Figure 18:
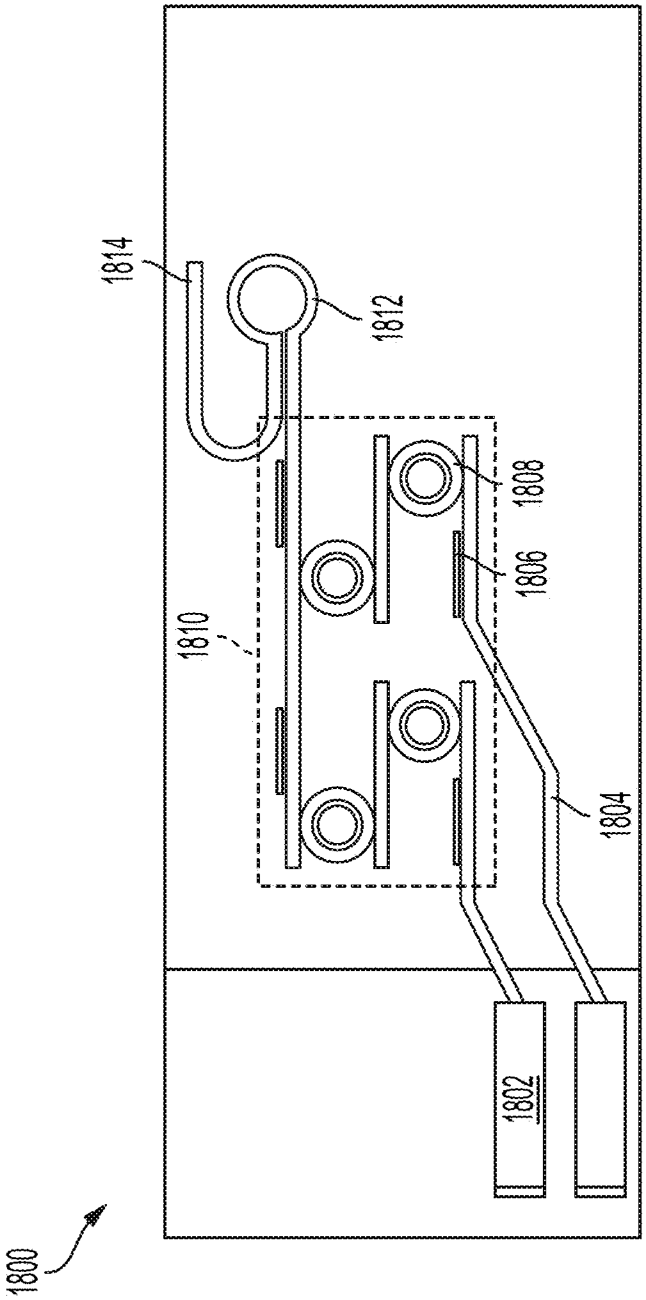
FIG. 18 is a schematic diagram of an example of an ECL, which could be incorporated into a fiber array chip, the ECL including RSOAs and active wavelength division multiplexing, in accordance with some embodiments described herein.

FIG. 18 is a schematic diagram of an example of a fiber array chip 1800 arranged as an ECL, including RSOA arrays 1802 and active wavelength division multiplexing, in accordance with some embodiments described herein. The RSOA arrays 1802 may be the same as RSOA arrays 1610 as described in connection with FIGS. 16A-16B herein. In some embodiments, the RSOA arrays 1802 are coupled to edge coupler 1814 by waveguides 1804, an active photonic multiplexer 1810, and waveguides 1812. The edge coupler 1814 may optically couple the fiber array chip 1800 to an external PIC (not depicted). In some embodiments, the edge coupler 1814 may be manufactured with a faceted face (e.g., having a face tilted an at angle relative to a cleaved face of the substrate supporting the fiber array chip 1800). In some embodiments, the facet of the edge coupler 1814 may be, alternatively or additionally, coated with an anti-reflective coating to reduce unintended reflections within the laser cavity of the fiber array chip 1800.

In some embodiments, the active photonic multiplexer 1810 is a photonic structure including a number of ring resonators 1808, tunable heaters 1806, and waveguides coupling the ring resonators 1808 in a stacked configuration. The ring resonators 1808 may each be tuned to pass particular wavelengths of light such that incoming light from the external PIC may be demultiplexed (e.g., using WDM) or that light output from the RSOA arrays 1802 may be multiplexed (e.g., within the laser cavity) prior to being output from the fiber array chip 1800. The tunable heaters 1806 may be provided to control phases of incoming or outgoing light and/or resonant wavelengths of the ring resonators 1808.

In some embodiments, during operation of the fiber array chip 1800, light may enter the fiber array chip 1800 from edge coupler 1814 and pass through waveguides 1812 prior to entering the active photonic multiplexer 1810 for demultiplexing and/or filtering. The demultiplexed optical signals are then output from the active photonic multiplexer 1810 to waveguides 1804 and then to RSOA arrays 1802 for reflection and amplification. The signals are then output from the RSOA arrays 1802 and returned to the active photonic multiplexer 1810 for multiplexing prior to output from the edge coupler 1814 to the external PIC.

The above description discloses a number of embodiments. Alternative aspects are disclosed in the following further embodiments:

Clause 1. A pluggable optical fiber array, comprising: a fiber array chip comprising first optical connections disposed on a first edge of the fiber array chip and second optical connections disposed on a second edge of the fiber array chip; and optical fibers coupled to the first optical connections.

Clause 2. The pluggable optical fiber array of clause 1, wherein the second optical connections are configured to optically couple the fiber array chip to one or more optical waveguides disposed on another chip.

Clause 3. The pluggable optical fiber array of clause 2, wherein the second optical connections comprise edge couplers.

Clause 4. The pluggable optical fiber array of any one of clauses 1-3, wherein the first optical connections comprise v-grooves.

Clause 5. The pluggable optical fiber array of any one of clauses 1-4, wherein the fiber array chip comprises a photonic integrated circuit (PIC).

Clause 6. The pluggable optical fiber array of clause 5, wherein the PIC comprises at least one active device comprising a photonic and/or electronic device.

Clause 7. The pluggable optical fiber array of clause 6, wherein the at least one active device is coupled to the first optical connections and/or the second optical connections.

Clause 8. The pluggable optical fiber array of clause 6 or 7, wherein the at least one active device comprises at least one laser.

Clause 9. The pluggable optical fiber array of any one of clauses 6-8, wherein the at least one active device comprises a laser array.

Clause 10. The pluggable optical fiber array of clause 9, wherein: the laser array comprises lasers configured to generate optical signals having different wavelengths, and the pluggable optical fiber array further comprises a multiplexer disposed between the laser array and the second optical connections, the multiplexer configured to perform wavelength division multiplexing of the generated optical signals.

Clause 11. The pluggable optical fiber array of clause 10, wherein the multiplexer comprises an arrayed waveguide grating (AWG).

Clause 12. The pluggable optical fiber array of clause 10, wherein the multiplexer comprises one or more Mach-Zehnder interferometers (MZIs).

Clause 13. The pluggable optical fiber array of any one of clauses 6-12, wherein the at least one active device comprises a photodetector.

Clause 14. The pluggable optical fiber array of any one of clauses 6-13, wherein the at least one active device comprises a semiconductor optical amplifier (SOA).

Clause 15. The pluggable optical fiber array of clause 14, wherein the SOA is coupled between the first optical connections and the second optical connections.

Clause 16. The pluggable optical fiber array of any one of clauses 1-15, further comprising a printed circuit board (PCB) electrically coupled to the fiber array chip.

Clause 17. The pluggable optical fiber array of clause 16, wherein the PCB is a flexible PCB.

Clause 18. The pluggable optical fiber array of clause 16 or 17, wherein the PCB is electrically coupled to the fiber array chip by solder bonds or thermocompression bonds.

Clause 19. The pluggable optical fiber array of any one of clauses 16-18, wherein the PCB further comprises thermal vias configured to thermally couple the fiber array chip to a substrate disposed on an opposing side of the PCB.

Clause 20. The pluggable optical fiber array of clause 19, wherein the substrate comprises a thermal spacer.

Clause 21. The pluggable optical fiber array of clause 19 or 20, wherein the substrate comprises a silicon substrate or an aluminum nitride substrate.

Clause 22. The pluggable optical fiber array of any one of clauses 19-21, further comprising a cold plate thermally coupled to the substrate.

Clause 23. The pluggable optical fiber array of any one of clauses 19-22, further comprising optical fibers optically coupled to the first optical connections.

Clause 24. The pluggable optical fiber array of clause 24, wherein the optical fibers are supported by the PCB.

Clause 25. An optical assembly, comprising: a first photonic integrated circuit (PIC) comprising first waveguides; and a second PIC removably coupled to the first PIC, the second PIC comprising second waveguides optically aligned with the first waveguides.

Clause 26. The optical assembly of clause 25, wherein the first waveguides and the second waveguides are coupled by edge couplers disposed on the first PIC and the second PIC.

Clause 27. The optical assembly of clause 25 or 26, wherein: the second waveguides of the second PIC are disposed on a first edge of the second PIC, and the second PIC further comprises additional optical connections disposed on a second edge of the second PIC.

Clause 28. The optical assembly of clause 27, wherein the additional optical connections comprise v-grooves.

Clause 29. The optical assembly of clause 27 or 28, wherein the second PIC comprises at least one active device comprising a photonic and/or electronic device.

Clause 30. The optical assembly of clause 29, wherein the at least one active device is coupled to the second waveguides or to the additional optical connections.

Clause 31. The optical assembly of clause 29 or 30, wherein the at least one active device comprises at least one laser.

Clause 32. The optical assembly of any one of clauses 29-31, wherein the at least one active device comprises a laser array.

Clause 33. The optical assembly of clause 32, wherein: the laser array comprises lasers configured to generate optical signals having different wavelengths, and the second PIC further comprises a multiplexer disposed between the laser array and the second waveguides, the multiplexer configured to perform wavelength division multiplexing of the generated optical signals.

Clause 34. The optical assembly of clause 33, wherein the multiplexer comprises an arrayed waveguide grating (AWG).

Clause 35. The optical assembly of clause 33, wherein the multiplexer comprises one or more Mach-Zehnder interferometers (MZIs).

Clause 36. The optical assembly of any one of clauses 29-35, wherein the at least one active device comprises a photodetector.

Clause 37. The optical assembly of any one of clauses 29-26, wherein the at least one active device comprises a semiconductor optical amplifier (SOA).

Clause 38. The optical assembly of clause 37, wherein the SOA is coupled between the first optical connections and the second optical connections.

Clause 39. The optical assembly of any one of clauses 25-38, further comprising a printed circuit board (PCB) electrically coupled to the second PIC.

Clause 40. The optical assembly of clause 39, wherein the PCB is a flexible PCB.

Clause 41. The optical assembly of clause 39 or 40, wherein the PCB is electrically coupled to the fiber array chip by solder bonds or thermocompression bonds.

Clause 42. The optical assembly of any one of clauses 39-42, wherein the PCB further comprises thermal vias configured to thermally couple the fiber array chip to a thermal substrate disposed on an opposing side of the PCB.

Clause 43. The optical assembly of clause 42, wherein the thermal substrate comprises a thermal spacer.

Clause 44. The optical assembly of clause 42 or 43, wherein the thermal substrate comprises a silicon substrate or an aluminum nitride substrate.

Clause 45. The optical assembly of any one of clauses 42-44, further comprising a first cold plate thermally coupled to the substrate.

Clause 46. The optical assembly of any one of clauses 27-45, further comprising optical fibers optically coupled to the additional optical connections.

Clause 47. The optical assembly of clause 46, wherein the optical fibers are supported by the PCB.

Clause 48. The optical assembly of any one of clauses 25-47, further comprising a substrate supporting the first PIC.

Clause 49. The optical assembly of clause 48, wherein the substrate supporting the first PIC is an organic substrate.

Clause 50. The optical assembly of clause 48 or 49, wherein the second PIC is disposed between the thermal substrate and the substrate supporting the first PIC.

Clause 51. The optical assembly of any one of clauses 25-51, wherein the first PIC is electrically coupled to circuitry.

Clause 52. The optical assembly of clause 51, wherein the circuitry comprises an application-specific integrated circuit (ASIC).

Clause 53. The optical assembly of any one of clauses 25-52, wherein the first PIC is thermally coupled to a second cold plate.

Clause 54. A method of manufacturing an optical assembly, comprising: bonding a fiber array chip comprising first optical connections arranged along a first edge of the fiber array chip and second optical connections arranged along a second edge of the fiber array chip to a printed circuit board (PCB); and coupling optical fibers to the first optical connections of the fiber array chip.

Clause 55. The method of clause 54, wherein bonding the fiber array chip to the PCB comprises making electrical connections between the fiber array chip and the PCB.

Clause 56. The method of clause 54 or 55, wherein bonding the fiber array chip to the PCB comprises bonding the fiber array chip to a flexible PCB.

Clause 57. The method of any one of clauses 54-56, wherein coupling the optical fibers to the first optical connections comprises coupling the optical fibers to the first optical connections through an opening in the PCB.

Clause 58. The method of any one of clauses 54-57, wherein coupling the optical fibers to the first optical connections comprises coupling the optical fibers to v-grooves disposed on the fiber array chip.

Clause 59. The method of any one of clauses 54-58, wherein coupling the optical fibers to the first optical connections further comprises coupling the optical fibers to at least one active device disposed on the fiber array chip, the at least one active device comprises a photonic and/or electronic device.

Clause 60. The method of any one of clauses 54-59, further comprising bonding a thermal substrate to the PCB, the thermal substrate being bonding to a side of the PCB opposing the fiber array chip.

Clause 61. The method of clause 60, wherein bonding the thermal substrate to the PCB comprises bonding a silicon substrate or an aluminum nitride substrate to the PCB.

Clause 62. The method of clause 60 or 61, further comprising coupling a cold plate to the thermal substrate.

Clause 63. The method of clause 62, further comprising thermally coupling the fiber array chip to the cold plate through the PCB and thermal substrate.

Clause 64. The method of any one of clauses 54-63, further comprising optically coupling the second optical connections of the fiber array chip to a photonic integrated circuit (PIC) external to the fiber array chip.

Clause 65. The method of clause 64, wherein optically coupling the second optical connections to the PIC comprises aligning the second optical connections with optical waveguides disposed on the PIC.

Clause 66. The method of clause 64 or 65, wherein optically coupling the second optical connections to the PIC comprises aligning edge couplers of the fiber array chip with edge couplers of the PIC.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, within ±2% of a target value in some embodiments. The terms "approximately," "substantially," and "about" may include the target value.

What is claimed is:

1. A pluggable optical fiber array, comprising:

a fiber array chip comprising first optical connections disposed on a first edge of the fiber array chip and second optical connections disposed on a second edge of the fiber array chip, wherein the fiber array chip comprises a photonic integrated circuit (PIC) comprising at least one active device comprising a photonic and/or electronic device; and optical fibers coupled to the first optical connections.

2. The pluggable optical fiber array of claim 1, wherein the second optical connections are configured to optically couple the fiber array chip to one or more optical waveguides disposed on another chip.

3. The pluggable optical fiber array of claim 2, wherein the second optical connections comprise edge couplers and the first optical connections comprise v-grooves.

4. The pluggable optical fiber array of claim 1, wherein the at least one active device comprises at least one laser.

5. The pluggable optical fiber array of claim 4, wherein:

the at least one laser comprises lasers configured to generate optical signals having different wavelengths, and the pluggable optical fiber array further comprises a multiplexer disposed between the lasers and the second optical connections, the multiplexer configured to perform wavelength division multiplexing of the generated optical signals.

6. The pluggable optical fiber array of claim 5, wherein the at least one active device comprises a semiconductor optical amplifier (SOA) coupled between the first optical connections and the second optical connections.

7. The pluggable optical fiber array of claim 1, further comprising a printed circuit board (PCB) electrically coupled to the fiber array chip.

8. The pluggable optical fiber array of claim 7, wherein the PCB is a flexible PCB.

9. The pluggable optical fiber array of claim 7, further comprising optical fibers optically coupled to the first optical connections.

10. An optical assembly, comprising:

a first photonic integrated circuit (PIC) comprising first waveguides; and a second PIC removably coupled to the first PIC, the second PIC comprising second waveguides optically aligned with the first waveguides, wherein the second PIC comprises at least one active device comprising a photonic and/or electronic device.

11. The optical assembly of claim 10, wherein:

the second waveguides of the second PIC are disposed on a first edge of the second PIC, and the second PIC further comprises additional optical connections disposed on a second edge of the second PIC.

12. The optical assembly of claim 10, wherein the at least one active device comprises at least one laser.

13. The optical assembly of claim 12, wherein:

the at least one laser comprises lasers configured to generate optical signals having different wavelengths, and the second PIC further comprises a multiplexer disposed between the lasers and the second waveguides, the multiplexer configured to perform wavelength division multiplexing of the generated optical signals.

14. The optical assembly of claim 13, wherein the multiplexer comprises an arrayed waveguide grating (AWG) or one or more Mach-Zehnder interferometers (MZIs).

15. The optical assembly of claim 11, wherein the at least one active device comprises a semiconductor optical amplifier (SOA) coupled between the second waveguides and the additional optical connections.

16. The optical assembly of claim 10, further comprising a printed circuit board (PCB) electrically coupled to the second PIC.

17. The optical assembly of claim 16, wherein the PCB further comprises thermal vias configured to thermally couple the second PIC to a thermal substrate disposed on an opposing side of the PCB.

18. The optical assembly of claim 17, further comprising a first cold plate thermally coupled to the second PIC via the thermal substrate and a second cold plate thermally coupled to the first PIC.

19. The optical assembly of claim 11, further comprising optical fibers optically coupled to the additional optical connections.

20. The optical assembly of claim 10, wherein the first PIC is electrically coupled to circuitry.

21. A method of manufacturing an optical assembly, comprising:

bonding a fiber array chip comprising first optical connections arranged along a first edge of the fiber array chip and second optical connections arranged along a second edge of the fiber array chip to a printed circuit board (PCB); and coupling optical fibers to the first optical connections of the fiber array chip, wherein coupling the optical fibers to the first optical connections further comprises coupling the optical fibers to at least one active device disposed on the fiber array chip, the at least one active device comprises a photonic and/or electronic device.

22. The method of claim 21, wherein bonding the fiber array chip to the PCB comprises making electrical connections between the fiber array chip and the PCB.

23. The method of claim 21, further comprising optically coupling the second optical connections of the fiber array chip to a photonic integrated circuit (PIC) external to the fiber array chip by aligning the second optical connections with optical waveguides disposed on the PIC.

24. An optical assembly, comprising:

a first photonic integrated circuit (PIC) comprising first waveguides;

a second PIC removably coupled to the first PIC, the second PIC comprising second waveguides optically aligned with the first waveguides; and a printed circuit board (PCB) electrically coupled to the second PIC, wherein the PCB further comprises thermal vias configured to thermally couple the second PIC to a thermal substrate disposed on an opposing side of the PCB.

25. The optical assembly of claim 24, wherein:

the second waveguides of the second PIC are disposed on a first edge of the second PIC, and the second PIC further comprises additional optical connections disposed on a second edge of the second PIC.

26. The optical assembly of claim 24, wherein the second PIC comprises at least one laser.

27. The optical assembly of claim 26, wherein:

the at least one laser comprises lasers configured to generate optical signals having different wavelengths, and the second PIC further comprises a multiplexer disposed between the lasers and the second waveguides, the multiplexer configured to perform wavelength division multiplexing of the generated optical signals.

28. The optical assembly of claim 27, wherein the multiplexer comprises an arrayed waveguide grating (AWG) or one or more Mach-Zehnder interferometers (MZIs).

29. The optical assembly of claim 25, wherein the second PIC comprises a semiconductor optical amplifier (SOA) coupled between the second waveguides and the additional optical connections.

* * * * *